United States Patent
Kitahara et al.

(10) Patent No.: US 10,567,455 B2
(45) Date of Patent: *Feb. 18, 2020

(54) RECEPTION DEVICE, RECEPTION METHOD, TRANSMISSION DEVICE, AND TRANSMISSION METHOD

(71) Applicant: Saturn Licensing LLC, New York, NY (US)

(72) Inventors: Jun Kitahara, Shizuoka (JP); Yasuaki Yamagishi, Kanagawa (JP); Naohisa Kitazato, Tokyo (JP); Kazuyuki Takahashi, Chiba (JP)

(73) Assignee: Saturn Licensing LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/406,108

(22) Filed: May 8, 2019

(65) Prior Publication Data

US 2019/0268391 A1  Aug. 29, 2019

Related U.S. Application Data

(63) Continuation of application No. 16/108,181, filed on Aug. 22, 2018, now Pat. No. 10,362,076, which is a (Continued)

(30) Foreign Application Priority Data

Oct. 11, 2013 (JP) .................................. 2013-214130

(51) Int. Cl.
*H04L 29/06* (2006.01)
*H04L 29/08* (2006.01)
(Continued)

(52) U.S. Cl.
CPC ........ *H04L 65/4076* (2013.01); *H04L 65/608* (2013.01); *H04L 67/2804* (2013.01);
(Continued)

(58) Field of Classification Search
CPC ...... H04H 60/25; H04H 60/73; H04L 1/0047; H04L 69/16; H04N 21/2362;
(Continued)

(56) References Cited

U.S. PATENT DOCUMENTS 10,084,832 B2 * 9/2018 Kitahara ............... H04L 65/608
10,291,341 B2 * 5/2019 Kitazato ............... H04L 65/607
(Continued)

FOREIGN PATENT DOCUMENTS

JP  2007-520937 A  7/2007
JP  2009-38788 A   2/2009
(Continued)

OTHER PUBLICATIONS

M. Handley, et al., "SDP: Session Description Protocol; rfc4566.txt", Network Working Group, pp. 1-49, (Jul. 1, 2006), XP015055003.
(Continued)

*Primary Examiner* — David R Lazaro
(74) *Attorney, Agent, or Firm* — Oblon, McClelland, Maier & Neustadt, L.L.P.

(57) ABSTRACT

The present technology relates to a reception device, a reception method, a transmission device, and a transmission method in which a convergence service of broadcasting and communication can be realized more effectively. A FLUTE processing unit is configured to acquire one or more components constituting a specific service of a plurality of services included in broadcast waves of digital broadcasting using an IP transfer system, in accordance with a first control signal including information indicating types and a transfer system of the one or more components constituting the
(Continued)

specific service such that the convergence service of broadcasting and communication can be realized more effectively. The present technology is applicable to, for example, a television receiver.

13 Claims, 27 Drawing Sheets

Related U.S. Application Data continuation of application No. 14/916,850, filed as application No. PCT/JP2014/005029 on Oct. 2, 2014, now Pat. No. 10,084,832.

(51) Int. Cl.
 *H04N 21/2362* (2011.01)
 *H04H 60/73* (2008.01)
 *H04N 21/434* (2011.01)
 *H04L 1/00* (2006.01)
 *H04H 60/25* (2008.01)

(52) U.S. Cl.
 CPC .............. *H04L 69/16* (2013.01); *H04H 60/25* (2013.01); *H04H 60/73* (2013.01); *H04L 1/0047* (2013.01); *H04N 21/2362* (2013.01); *H04N 21/4345* (2013.01)

(58) Field of Classification Search
 CPC ......... H04N 21/26283; H04N 21/4345; H04N 21/64315; H04W 4/06
 See application file for complete search history.

(56) References Cited

U.S. PATENT DOCUMENTS

| | | | |
|---|---|---|---|
| 10,362,076 B2* | 7/2019 | Kitahara | H04L 67/2804 |
| 2009/0060030 A1* | 3/2009 | Song | H04L 69/16 |
| | | | 375/240.01 |
| 2010/0169504 A1 | 7/2010 | Gabin et al. | |
| 2013/0034032 A1* | 2/2013 | Vare | H04L 69/22 |
| | | | 370/310 |
| 2013/0182643 A1 | 7/2013 | Pazos et al. | |
| 2016/0197970 A1* | 7/2016 | Kitahara | H04L 65/608 |
| | | | 709/219 |
| 2018/0124436 A1* | 5/2018 | Takahashi | H04N 21/236 |
| 2018/0175955 A1* | 6/2018 | Kitazato | H04L 65/607 |
| 2019/0007471 A1* | 1/2019 | Kitahara | H04L 65/608 |
| 2019/0222333 A1* | 7/2019 | Kitazato | H04L 65/607 |

FOREIGN PATENT DOCUMENTS

| | | |
|---|---|---|
| JP | 2009-510813 A | 3/2009 |
| JP | 2010-93659 A | 4/2010 |
| JP | 2010-539861 A | 12/2010 |
| JP | 2011-193058 A | 9/2011 |
| JP | 2012-515496 A | 7/2012 |
| WO | WO 2006/114830 A1 | 11/2006 |
| WO | WO 2010/080006 A2 | 7/2010 |
| WO | WO 2011/139266 A1 | 11/2011 |

OTHER PUBLICATIONS

International Search Report dated Dec. 10, 2014 in PCT/JP14/005029 Filed Oct. 2, 2014.
Office Action dated Feb. 7, 2017 in Japanese Patent Application No. 2013-214130 (w/English language translation).

* cited by examiner

FIG. 2

| ELEMENT/ATTRIBUTE | | | NUMBER OF OCCURRENCE | DEFINITION |
|---|---|---|---|---|
| sat | | | 1 | SERVICE ASSOCIATION TABLE |
| | service | | 0..n | ON-AIR SERVICE |
| | | @service_id | 1 | IDENTIFIER OF ON-AIR SERVICE |
| | | @service_type | 1 | SERVICE TYPE ("broadcasting", "hybrid") broadcasting: SERVICE ONLY BY BROADCASTING hybrid: SERVICE BY BROADCASTING AND COMMUNICATION |
| | | usd_enforcement_flag | 0..1 | INSTRUCT CHANNEL SELECTION PROCESSING OF ACQUISITION OF USD |

FIG. 3

```
<SAT xmlns= "urn:ATSC:2013:SAT:1.1 "xmlns:xsi=http://www.w3.org/2001/XMLSchema-instance
xsi:schemaLocation=http://www.atsc.org/ns/sat.xsd>
    <service service_id= "0001"  service_type= "broadcasting"/>
    <service service_id= "0002"  service_type= "hybrid"/>
</SAT>
```

*FIG. 4*

```
SGDU
  ┌─────────────────────────────────────────────┐
  │ Unit header                                 │
  │   · OFFSET VALUE TO EXTENSION               │
  │   · NUMBER OF FRAGMENTS (e.g. 1)            │
  │       · FRAGMENT ID                         │
  │       · FRAGMENT VERSION                    │
  └─────────────────────────────────────────────┘
  ┌─────────────────────────────────────────────┐
  │ Unit Payload                                │
  │   · FRAGMENT ENCODE TYPE                    │
  │   ┌───────────────────────────────────────┐ │
  │   │ MPD                                   │ │
  │   │                                       │ │
  │   └───────────────────────────────────────┘ │
  └─────────────────────────────────────────────┘
  ┌─────────────────────────────────────────────┐
  │ Extension                                   │
  │   · EXTENSION TYPE                          │
  │   · OFFSET VALUE TO SUBSEQUENT EXTENSION    │
  │   · NUMBER OF COMPONENTS                    │
  │       · COMPONENT TYPE                      │
  │       · TRANSFER TYPE VALUE (broadcasting/hybrid) │
  └─────────────────────────────────────────────┘
```

FIG. 5

```
<MPD
  xmlns:xsi="http://www.w3.org/2001/XMLSchema-instance"
  xmlns="urn:mpeg:DASH:schema:MPD:2011"
  xsi:schemaLocation="urn:mpeg:DASH:schema:MPD:2011 DASH-MPD.xsd"
  type="static"
  mediaPresentationDuration="PT3256S"
  minBufferTime="PT1.2S"
  profiles="urn:mpeg:dash:profile:isoff-on-demand:2011">|
  <BaseURL>http://cdn1.example.com/</BaseURL>
  <Period>
    <!-- English Audio -->
    <AdaptationSet mimeType="audio/mp4" codecs="mp4a.40.2" lang="en"
            subsegmentAlignment="true" subsegmentStartsWithSAP="1">
      <ContentProtection schemaIdUri="urn:uuid:706D6953-656C-5244-4D48-
                                                 656164657221"/>
      <Representation id="1" bandwidth="64000">
        <BaseURL>7657412348.mp4</BaseURL>
      </Representation>
      <Representation id="2" bandwidth="32000">
        <BaseURL>3463646346.mp4</BaseURL>
      </Representation>
    </AdaptationSet>
    <!-- Video -->
    <AdaptationSet mimeType="video/mp4" codecs="avc1.4d0228"
            subsegmentAlignment="true" subsegmentStartsWithSAP="2">
      <ContentProtection schemaIdUri="urn:uuid:706D6953-656C-5244-4D48-
                                                 656164657221"/>
      <Representation id="3" bandwidth="256000" width="320" height="240">
        <BaseURL>8563456473.mp4</BaseURL>
      </Representation>
      <Representation id="4" bandwidth="1024000" width="640" height="480">
        <BaseURL>562465736.mp4</BaseURL>
      </Representation>
      <Representation id="5" bandwidth="2048000" width="1280" height="720">
        <BaseURL>23536745734.mp4</BaseURL>
      </Representation>
    </AdaptationSet>
  </Period>
</MPD>
```

FIG. 6

- SDP Additional attribute syntax
1. content-location
    - a=component-location: [location]
2. TSI
    - a=flute-session-tsi: [tsi]
3. TOI
    - a=flute-object-toi: [toi]
4. content-type
    - a=content-type: [type]

FIG. 7

```
v=0
o=author001 0000000001 0000000002 IN IP6 10.5.100.20.55
s=SDP example
i=Information
c=IN IP 220.2.15.19/127
t=1000000000 1000100000
m=application 12345 FLUTE/UDP
a=component-location: http://www.aaa.com/bb/video.vi
a=flute-session-tsi:1
a=flute-session-toi:1
a=content-type:video/mp4
m=application 12346 FLUTE/UDP
a=component-location: http://www.aaa.com/bb/audio.au
a=flute-session-tsi:2
a=flute-session-toi:1
a=content-type:audio/mp4
```

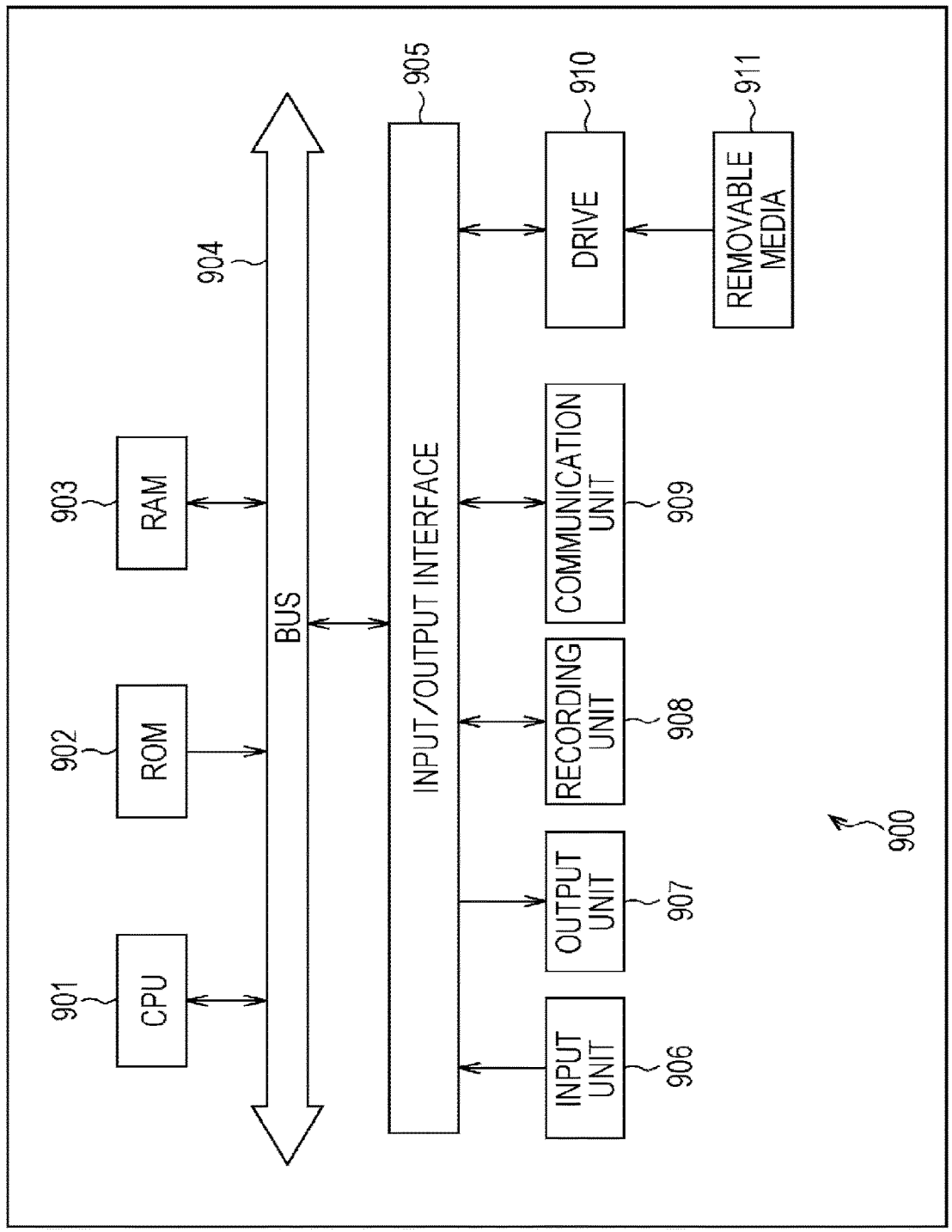

RECEPTION DEVICE, RECEPTION METHOD, TRANSMISSION DEVICE, AND TRANSMISSION METHOD

CROSS REFERENCE TO RELATED APPLICATIONS

This application is a continuation of and claims the benefit of priority under 35 U.S.C. § 120 from U.S. application Ser. No. 16/108,181 filed Aug. 22, 2018, which is a continuation of U.S. application Ser. No. 14/916,850 filed Mar. 4, 2016 (now U.S. Pat. No. 10,084,832 issued Sep. 25, 2018), which is a national stage of International Application No. PCT/JP2014/005029 filed Oct. 2, 2014, which claims the benefit of priority under 35 U.S.C. § 119 Japanese Patent Application No. 2013-214130 filed Oct. 11, 2013, the entire contents of each of which are incorporated herein by reference.

TECHNICAL FIELD

The present technology relates to a reception device, a reception method, a transmission device, and a transmission method, and particularly to a reception device, a reception method, a transmission device, and a transmission method in which a convergence service of broadcasting and communication can be realized more effectively.

BACKGROUND ART

As a terrestrial digital broadcasting standard of the related art, there is an advanced television systems committee (ATSC) standard. In the ATSC standard, an MPEG2-TS (ISO/IEC 13818-1) system is used as a standard of a transport system. In addition, system information (SI) and program guide data (PG) are superimposed with streams of video/audio or the like of a program for transfer. A transfer method and a data structure thereof are standardized in ATSC A/65 as a program and system information protocol (PSIP).

On the other hand, in the area of a communication service, a service in which an internet protocol (IP) system such as an IP/TCP/HTTP or IP/UDP/RTP is employed in the transport system as a base is mainly used (e.g., see PTL 1). Particularly, an IP/UDP is generally used in a unidirectional service similar to a broadcasting service.

CITATION LIST

Patent Literature

[PTL 1]
JP 2011-193058A

SUMMARY OF INVENTION

Technical Problem

A standard of a transfer system is based on MPEG2-TS in a broadcasting service technique of the related art; however, it is assumed that a convergence service of broadcasting and communication will continue spreading in the future, and accordingly, it is considered that the IP system is being further employed in the transport system and a common use of SI information and PG information is advancing in areas of the broadcasting and the communication. For this reason, a technique for further effectively realizing the convergence service of broadcasting and communication while adopting the related art is required; however, such a technique system has not been established in the present circumstances.

The present technology has been made in view of such circumstances and can more effectively realize a convergence service of broadcasting and communication while adopting the related art.

Solution to Problem

According to an embodiment of the present technology, a reception device includes circuitry configured to receive a digital broadcast signal including an internet protocol (IP) transport stream; and acquire one or more components of a specific service of a plurality of services included in the digital broadcast signal in accordance with first control information, the first control information including component type information and transfer type information of the one or more components of the specific service.

The transfer type information of the one or more components indicates whether each of the one or more components is broadcasted or provided via another communication medium.

The first control information is transferred by a first layer which is higher than an IP layer of a protocol used to transmit the digital broadcast signal.

The circuitry is configured to acquire second control information that is transferred by a packet having a structure which is different from a structure of an IP packet and acquire the one or more components of the specific service in accordance with the second control information, the second control information including information indicating a transfer type of the specific service.

The second control information includes information indicating whether the specific service of the plurality of services is on-air.

The second control information includes information indicating whether third control information is to be acquired, the third control information including information for acquiring the first control information.

The one or more components, the first control information, and the third control information are transferred by a FLUTE session.

A reception device according to an embodiment of the present technology may be an independent device and may be an internal block constituting one device.

A reception method according to the embodiment of the present technology is a reception method corresponding to the above-described reception device according to the embodiment of the present technology.

In the reception device and the reception method according to the embodiment of the present technology, a digital broadcast signal including an IP transport stream is received by circuitry of the reception device, and one or more components of a specific service of a plurality of services included in the digital broadcast is acquired by the circuitry in accordance with control information, the control information including component type information and transfer type information of the one or more components of the specific service.

A transmission device according to the embodiment of the present technology includes circuitry configured to acquire one or more components of a specific service; acquire control information including component type information and transfer type information of the one or more components of the specific service; and transmit a digital broadcast signal including the one or more components of the specific service and the control information, the digital broadcast signal including an IP transport stream.

The transmission device according to the embodiment of the present technology may be an independent device and may be an internal block constituting one device.

A transmission method according to the embodiment of the present technology is a reception method corresponding to the above-described transmission device according to the embodiment of the present technology.

In the transmission device and the transmission method according to the embodiment of the present technology, one or more components of a specific service are acquired, control information including component type information and transfer type information of the one or more components of the specific service is acquired by circuitry of the transmission device, and a digital broadcast signal including the one or more components of the specific service and the control information is transmitted by the circuitry, the digital broadcast signal including an IP transport stream.

A reception device according to the embodiment of the present technology includes circuitry configured to receive a digital broadcast signal including an IP transport stream; and acquire one or more components of a specific service of a plurality of services included in the digital broadcast signal in accordance with second control information, the second control information including information indicating a transfer type of the specific service.

The second control information includes information indicating whether the specific service of the plurality of services is on-air.

The second control information is transferred by a packet having a structure which is different from a structure of an IP packet.

The circuitry is configured to acquire the one or more components of the specific service in accordance with first control information, the first control information including component type information and transfer type information of the one or more components of the specific service.

The transfer type information of the one or more components indicates whether each of the one or more components is broadcasted or provided via another communication medium.

The second control information includes information indicating whether third control information is to be acquired, the third control information including information for acquiring the first control information.

The one or more components, the first control information, and the third control information are transferred by a FLUTE session.

The reception device according to the embodiment of the present technology may be an independent device and may be an internal block constituting one device.

A reception method according to the embodiment of the present technology is a reception method corresponding to the above-described reception device according to the embodiment of the present technology.

In the reception device and the reception method according to embodiment of the present technology, a digital broadcast signal including an IP transport stream is received by circuitry of the reception device, and one or more components of a specific service of a plurality of services included in the digital broadcast is acquired by the circuitry in accordance with control information, the control information including information indicating a transfer type of the specific service.

A transmission device according to a embodiment of the present technology includes circuitry configured to acquire one or more components of a specific service; acquire control information including information indicating a transfer type of the specific service; and transmit a digital broadcast signal including the one or more components of the specific service and the control information, the digital broadcast signal including an IP transport stream.

The transmission device according to the embodiment of the present technology may be an independent device and may be an internal block constituting one device.

A transmission method according to the embodiment of the present technology is a reception method corresponding to the above-described transmission device according to the embodiment of the present technology.

In the transmission device and the transmission method according to the embodiment of the present technology, one or more components of a specific service are acquired, control information including information indicating a transfer type of the specific service is acquired by circuitry of the transmission device, and a digital broadcast signal including the one or more components of the specific service and the control information are transmitted by the circuitry, the digital broadcast signal including an IP transport stream.

Advantageous Effects of Invention

According to an embodiment of the present technology, it is possible to further effectively realize the convergence service of broadcasting and communication.

Further, the advantageous effects disclosed herein are not necessarily limited; however, there may be any effect disclosed in this disclosure.

BRIEF DESCRIPTION OF DRAWINGS

FIG. 2 is a diagram illustrating an example of syntax of an SAT.

FIG. 3 is a diagram illustrating a description example of the SAT.

FIG. 4 is a diagram illustrating a configuration example of an MPD.

FIG. 5 is a diagram illustrating a description example of the MPD.

FIG. 6 is a diagram illustrating an example of syntax of an SDP.

FIG. 7 is a diagram illustrating a description example of the SDP.

FIG. 27 is a diagram illustrating a configuration example of a computer.

DESCRIPTION OF EMBODIMENTS

Hereinafter, an embodiment of the present technology will be disclosed with reference to the drawings. However, it is assumed to be disclosed in the following order.

1. Summary of IP transfer system
2. Signaling information
 (1) Detailed structure of LLS (SAT)
 (2) Detailed structure of SCS (MPD, SDP)
3. Configuration of broadcasting system
4. Concrete operation examples
5. Contents of concrete processing to be executed by each device <1. Summary of IP Transfer System>

Figure 1:
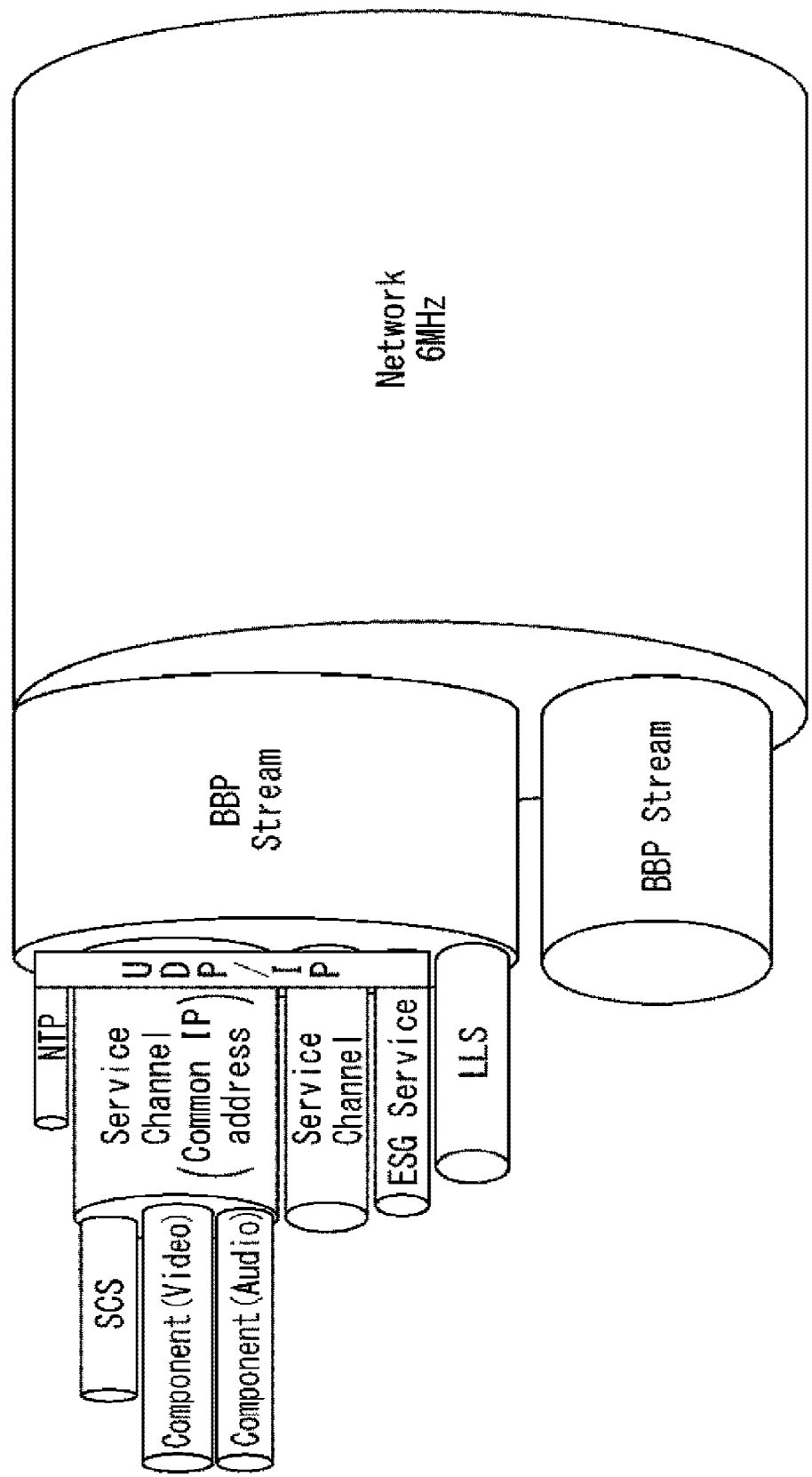
FIG. 1 is a diagram illustrating a configuration of a broadcast wave of digital broadcasting of an IP transfer system.

FIG. 1 is a diagram illustrating a configuration of a broadcast wave of digital broadcasting of an IP transfer system.

As illustrated in FIG. 1, it is possible to acquire one or more BBP streams from a broadcast wave ("Network" in the drawing) having a frequency band of 6 MHz. In addition, it is possible to acquire a network time protocol (NTP), a plurality of service channels, an electronic service guide (ESG) service, and a low layer signaling (LLS) from each of the BBP streams. As illustrated in FIG. 1, the NTP, the service channels, and the ESG are transferred according to a protocol such as UDP/IP; however, the LLS is transferred on the BBP stream.

The NTP is time information and is used in common by the plurality of service channels. The ESG is an electronic service guide and includes, for example, information such as a program title or start time. The LLS is low layer signaling information and is configured to transfer, for example, service configuration information such as a service configuration table (SCT) or a service association table (SAT).

The SCT includes a triplet which will be disclosed below and refers to a BBP stream configuration and a service configuration in the broadcast wave. In addition, the SCT includes bootstrap information for accessing to the ESG or an SCS. The SAT indicates an on-air service for each BBP stream. By the SAT, it is possible to determine whether a specific service is on-air (under broadcasting).

Each of the service channels includes one or more components and service channel signaling (SCS). Further, a common IP address is allocated to each of the service channels. The service channel is simply referred to as a service in the following explanation.

A component is made up of, for example, video data (Video) or audio data (Audio) and is transferred by a file delivery over unidirectional transport (FLUTE) session. Further, in the example of FIG. 1, the video data and the audio data are illustrated as the component; however, for example, other data such as a subtitle or an audio description for a visually-impaired person may be transferred. The SCS is signaling information of service units and is transferred by the FLUTE session. For example, a session description protocol (SDP), a media presentation description (MPD) or the like is transferred as the SCS. The SDP includes a service attribute of service units, component configuration information, a component attribute, component filter information, component location information or the like. In addition, the MPD includes a segment uniform resource locator (URL) for each component to be transferred in service units.

Further, in the configuration of the broadcast wave of the digital broadcasting of the IP transfer system illustrated in FIG. 1, a network_id is allocated to the broadcast wave. In addition, each of the BBP streams included in the broadcast wave is identified by a BBP_stream_id. Then, the service channel (service) included in each of the BBP streams is identified by a service_id. That is, the digital broadcasting of the IP transfer system employs an ID system similar to the combination (hereinafter, referred to as a "triplet") of the network_id, transport_stream_id, and service_id to be used in an MPEG2-TS scheme which is a traditional broadcasting service technique, and the BBP stream configuration and the service configuration in a broadcasting network is displayed by the triplet.

<2. Signaling Information>
<(1) Detailed Structure of LLS (SAT)>
(Configuration of SAT)

FIG. 2 is a diagram illustrating an example of syntax of the SAT. In an element and an attribute, further, the attribute is represented in a form in which a symbol "@" is added in FIG. 2. In addition, indented elements and attributes are designated for higher order elements thereof.

As illustrated in FIG. 2, a sat element includes a service element. When a plurality of on-air services is present, a plurality of service elements is disposed to correspond to these services. In addition, the service element includes a service_id attribute, a service_type attribute, and an usd_enforcement_flag element.

In the service_id attribute, an identifier of the on-air service is designated. In the service_type attribute, service type information is designated. For example, "broadcasting" is designated in the case of the service only by the broadcasting and "hybrid" is designated in the case of a convergence service of broadcasting and communication. The usd_enforcement_flag element is used to instruct channel selection processing of the acquisition of a user service description (USD). The USD is information to acquire the SDP or the MPD.

FIG. 3 is a diagram illustrating a description example of the SAT. The description example of FIG. 3 illustrates the on-air service in the selected broadcasting network as two examples of service_id="0001" and "0002". In addition, FIG. 3 illustrates that the service of service_id="0001" provides a component only by the broadcasting and the service of service_id="0002" provides a component by the broadcasting and the communication.

<(2) Detailed Structure of SCS (MPD, SDP)>
(Configuration of MPD)

FIG. 4 is a diagram illustrating a configuration example of the MPD.

As illustrated in FIG. 4, the MPD is stored and transferred in a service guide delivery unit (SGDU) container. The service guide delivery unit (SGDU) is made up of a header unit (Unit Header), a payload unit (Unit Payload), and an extension.

In the header unit, a fragment ID and a fragment version are disposed for each fragment. An offset value to the extension is designated, and thus the location of the extension can be indicated in the header unit. The fragment ID indicates fragment identification. The fragment version indicates a version number of the fragment.

A fragment encoding type and MPD data are disposed in the payload unit. The fragment encoding type refers to type information of fragment encoding. An XML document described in, for example, an XML (Extensible Markup Language) format is disposed as the MPD. FIG. 5 illustrates a description example of the MPD. As illustrated in FIG. 5, a character string obtained by combining a URL (e.g., http://cdn1.example.com/) of a delivery server designated by a BaseURL element with a file name (e.g., 7657412348.mp4) is considered as a segment URL.

Referring back to FIG. 4, an extension type, a component type, and a transfer type value are disposed for each component in the extension. In addition, an offset value to a subsequent extension is designated, and thus the location of the subsequent extension can be indicated in the extension when a plurality of extensions is disposed.

The extension type refers to extension type information. The component type refers to, for example, component type information such as mime-type (e.g., Video/mp4 and Audio/mp4). The transfer type value refers to a component transfer system. For example, "broadcasting" is designated when the component is transferred by the broadcasting, and a "hybrid" is designated when the component is transferred by the communication.

(Configuration of SDP)

A SDP description document is made up of two parts of a session description part and a media description part. A protocol version, instance creator information, connection data or the like is described in the session description part. In addition, a plurality of kinds of media information can be described in the media description part. Here, as illustrated in FIG. 6, the SDP is configured such that information such as a content-location, a flute-session-tsi, a flute-session-toi, or a content-type described in a file delivery table (FDT) can be designated as a media attribute indicated by "a=". Although details will be disclosed below, the FDT is index information which is transferred at a predetermined transfer period for each FLUTE session.

In FIG. 6, a URL in which a component is delivered is designated in the location. For example, in the location, "http://www.aaa.com/bb/video.v" is designated. In the tsi, an ID of the FLUTE session to which the component is delivered is designated. In the tsi, an integer value of 1 or more is designated. In the toi, an ID of the component is designated. In the toi, an integer value of 0 or more is designated. In the type, a component type is designated. Such a type is designated by a mime-type.

FIG. 7 illustrates a description example of the SDP.

In FIG. 7, a descriptor "v" refers to a protocol version. As a value of this descriptor, "0" or a value decided by service operation is designated.

A descriptor "o" refers to instance creator information. As a value of this descriptor, a creator name, an ID of SDP instance, a version, a transmission (host) type, an IP address type, and an IP address are designated. For example, an IN (internet), a BC (broadcasting), or an HB (hybrid) is designated as the transmission (host) type. In addition, IPv4 or IPv6 is designated as the IP address type. Further, a value designated as the transmission (host) type is merely an example, and it is considered that an appropriate value is determined depending on a transmission network of the SDP to be used in an actual service in the future.

A descriptor "s" refers to a session name. As a value of this descriptor, the session name is described in a text format. A descriptor "i" refers to additional information on the session. As a value of this descriptor, the explanation of the session is described.

A descriptor "c" refers to connection data. As a value of this descriptor, a network type of session, an IP address type, and an IP address are designated. For example, an IN (internet), a BC (broadcasting), or an HB (hybrid) is designated as the network type of session. In addition, IPv4 or IPv6 is designated as the IP address type. Further, a value designated as the network type of session is merely an example, and it is considered that an appropriate value is determined depending on the transmission network of the SDP to be used in the actual service in the future. A descriptor "t" refers to effective start/finish time of the session.

A descriptor "m" refers to media information. As a value of this descriptor, a media type, a port number for transmitting the media, a protocol for transmitting the media, a format or the like is designated. For example, as the media type, a video or an audio is designated. In addition, as the protocol for transmitting the media, FLUTE/UDP, RTP/AVP or the like is designated. Further, as the format, additional information is described for each protocol if necessary.

In the description example of FIG. 7, two kinds of media information are described. As first media information, "application 12345 FLUTE/UDP" is designated. In addition, lines starting with "a=" refer to an attribute of the corresponding media. That is, "http://www.aaa.com/bb/video.vi" is designated as an URL in which the component is delivered, "1" is designated as an ID (TSI) of the FLUTE session in which the component is delivered, "1" is designated as an ID (TOI) of the component, and "video/mp4" is designated as a component type.

In addition, as second media information, "application 12346 FLUTE/UDP" is designated. That is, "http://www.aaa.com/bb/audio.au" is designated as an URL in which the component is delivered, "2" is designated as the ID (TSI) of the FLUTE session in which the component is delivered, "1" is designated as the ID (TOI) of the component, and "audio/mp4" is designated as the component type.

<3. Configuration of Broadcasting System>
(Configuration Example of Broadcasting System)

Figure 8:
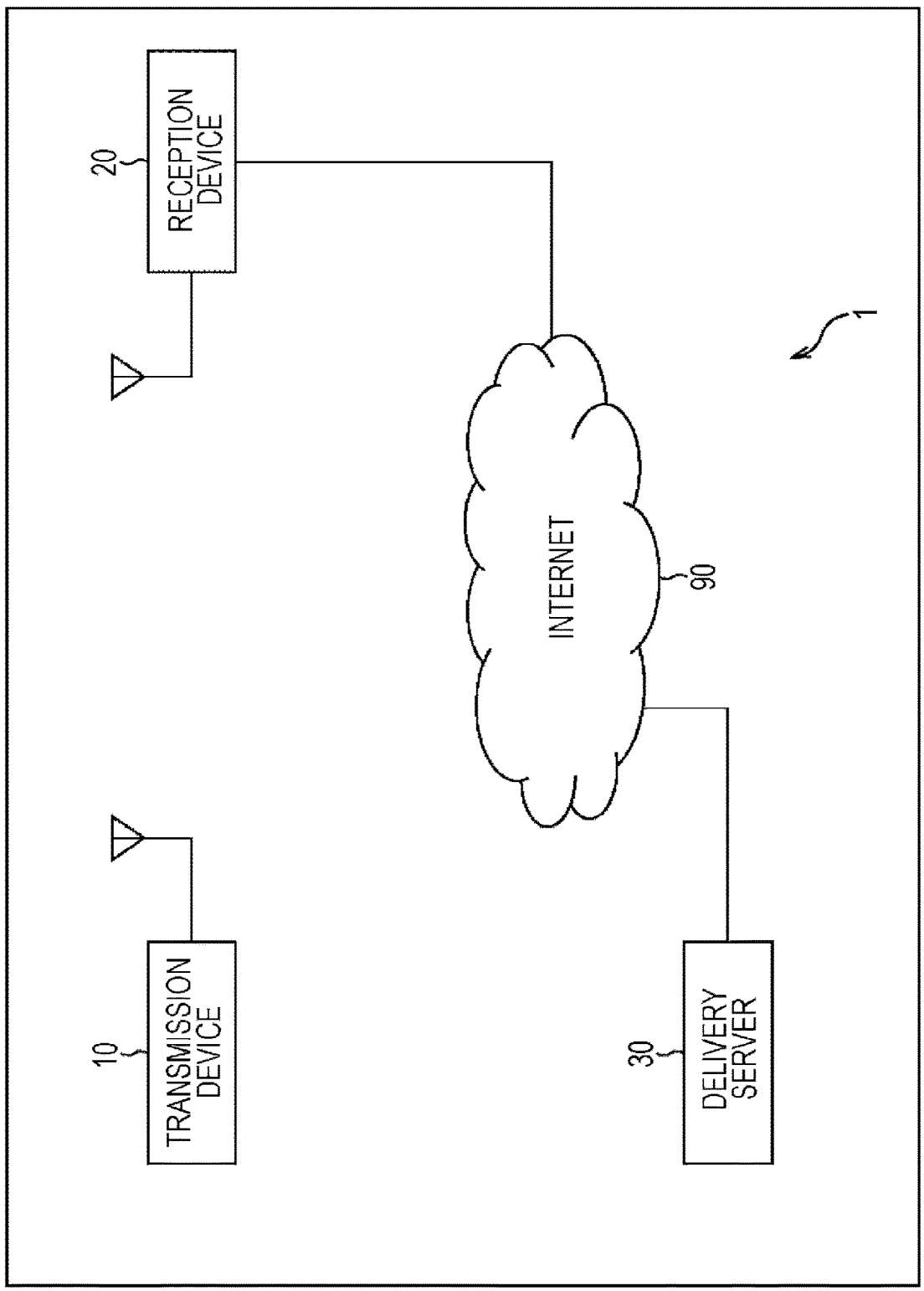
FIG. 8 is a diagram illustrating a configuration according to an embodiment of a broadcasting system to which the present technology is applied.

FIG. 8 is a diagram illustrating a configuration according to an embodiment of a broadcasting system to which the present technology is applied.

As illustrated in FIG. 8, a broadcasting system 1 is made up of a transmission device 10, a reception device 20, and a delivery server 30. In addition, the reception device 20 and the delivery server 30 are connected to each other through an internet 90.

The transmission device 10 transmits broadcasting content such as a TV program depending on broadcast waves of a digital broadcasting using an IP transfer system.

The reception device 20 receives the broadcast signal transmitted from the transmission device 10 and acquires video and audio of the broadcasting content. The reception device 20 displays the video of the broadcasting content on a display and outputs the audio synchronized with the video from a loudspeaker. Further, the reception device 20 may be configured as a single body including the display and the loudspeaker and may be incorporated in a television receiver, a video recorder or the like.

The delivery server 30 delivers at least one of video or audio as communication content corresponding to the broadcasting content through the internet 90 in response to a request from the reception device 20. Further, in addition to the video and audio, for example, a subtitle, an audio description for a visually-impaired person or the like may be delivered as the communication content.

The reception device 20 receives the communication content delivered from the delivery server 30 through the internet 90. For example, the reception device 20 outputs the audio of the communication content which is synchronized with the video of the broadcasting content, from the loudspeaker. In addition, for example, the reception device 20 displays the video of the communication content which is synchronized with the audio of the broadcasting content, on the display.

The broadcasting system 1 is configured as disclosed above.

(Configuration Example of Transmission Device)

Figure 9:
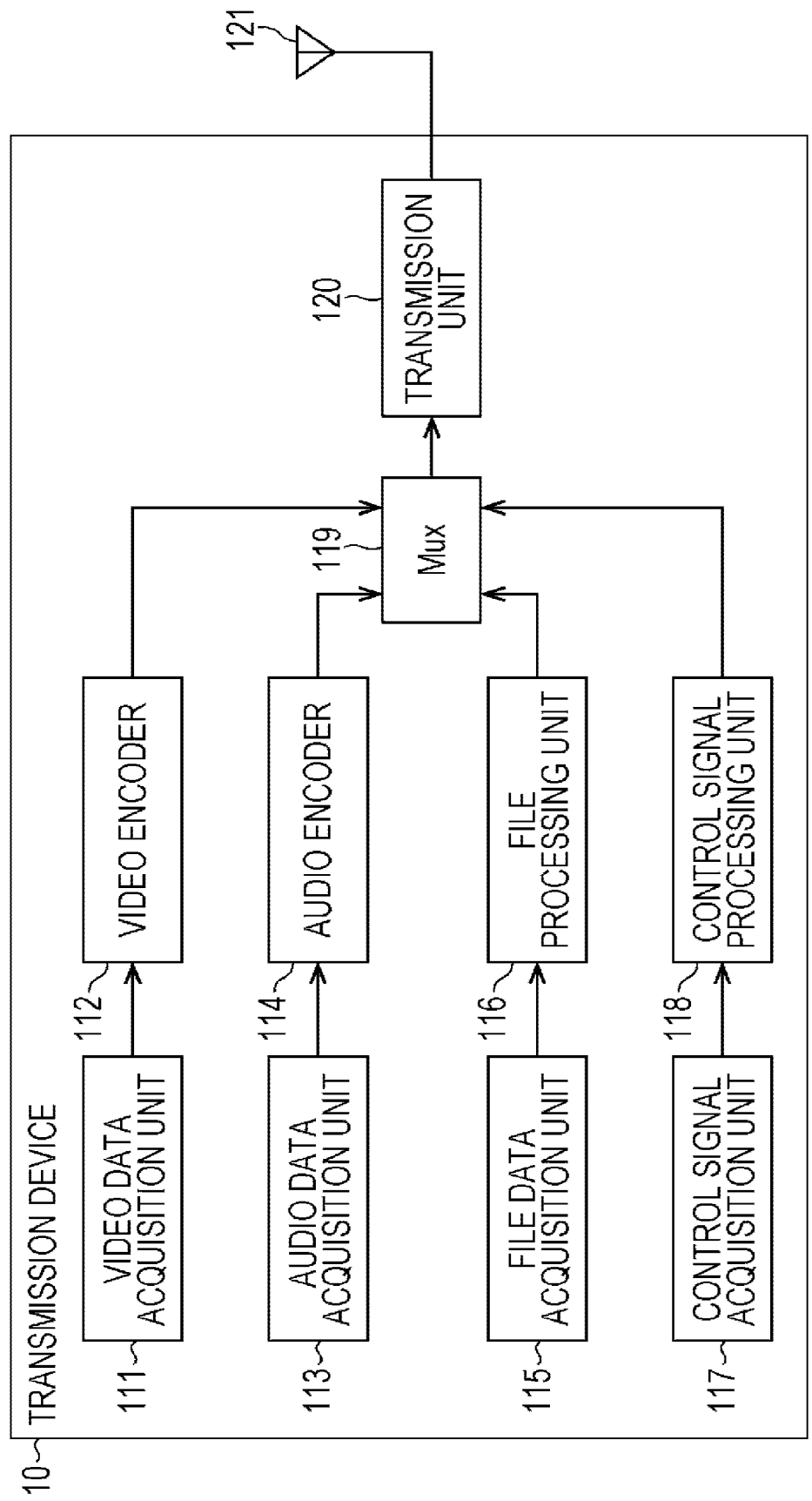
FIG. 9 is a diagram illustrating a configuration according to an embodiment of a transmission device to which the present technology is applied.

FIG. 9 is a diagram illustrating a configuration according to an embodiment of the transmission device to which the present technology is applied.

As illustrated in FIG. 9, the transmission device 10 includes a video data acquisition unit 111, a video encoder 112, an audio data acquisition unit 113, an audio encoder 114, a file data acquisition unit 115, a file processing unit 116, a control signal acquisition unit 117, a control signal processing unit 118, a Mux 119, and a transmission unit 120.

In the case of transferring data of a synchronous stream format, the video data acquisition unit 111 acquires video data from an incorporated storage or an external server, a camera and the like, and supplies the acquired video data to the video encoder 112. The video encoder 112 encodes the video data supplied from the video data acquisition unit 111 based on an encoding scheme such as MPEG and supplies the encoded video data to the Mux 119.

In the case of transferring data of a synchronous stream format, the audio data acquisition unit 113 acquires audio data from the incorporated storage or the external server, a microphone and the like, and supplies the acquired audio data to the audio encoder 114. The audio encoder 114 encodes the audio data supplied from the audio data acquisition unit 113 based on the encoding scheme such as the MPEG and supplies the encoded audio data to the Mux 119.

In the case of transferring data of an asynchronous file format, the file data acquisition unit 115 acquires file data of, for example, video data or audio data, ESG, application, or content from the incorporated storage, the external server or the like and supplies the acquired file data to the file processing unit 116. The file processing unit 116 performs predetermined file processing on the file data supplied from the file data acquisition unit 115 and supplies the file-processed file data to the Mux 119. For example, the file processing unit 116 performs the file processing on the file data acquired by the file data acquisition unit 115 to transfer the file-processed file data using the FLUTE session.

The control signal acquisition unit 117 acquires a control signal such as an LLS or SCS from an incorporated storage, an external server or the like and supplies the acquired control signal to the control signal processing unit 118. The control signal processing unit 118 performs predetermined signal processing on the control signal supplied from the control signal acquisition unit 117 and supplies the signal-processed control signal to the Mux 119. For example, the control signal processing unit 118 performs the signal processing on the SCS acquired by the control signal acquisition unit 117 to transfer the signal-processed SCS using the FLUTE session.

The Mux 119 multiplexes the video data supplied from the video encoder 112, the audio data supplied from the audio encoder 114, the file data supplied from the file processing unit 116, and the control signal supplied from the control signal processing unit 118 to generate a BBP stream of an IP transfer format, and supplies the generated BBP stream to the transmission unit 120. The transmission unit 120 transmits the BBP stream supplied from the Mux 119 as a broadcast signal through an antenna 121.

(Configuration Example of Reception Device)

Figure 10:
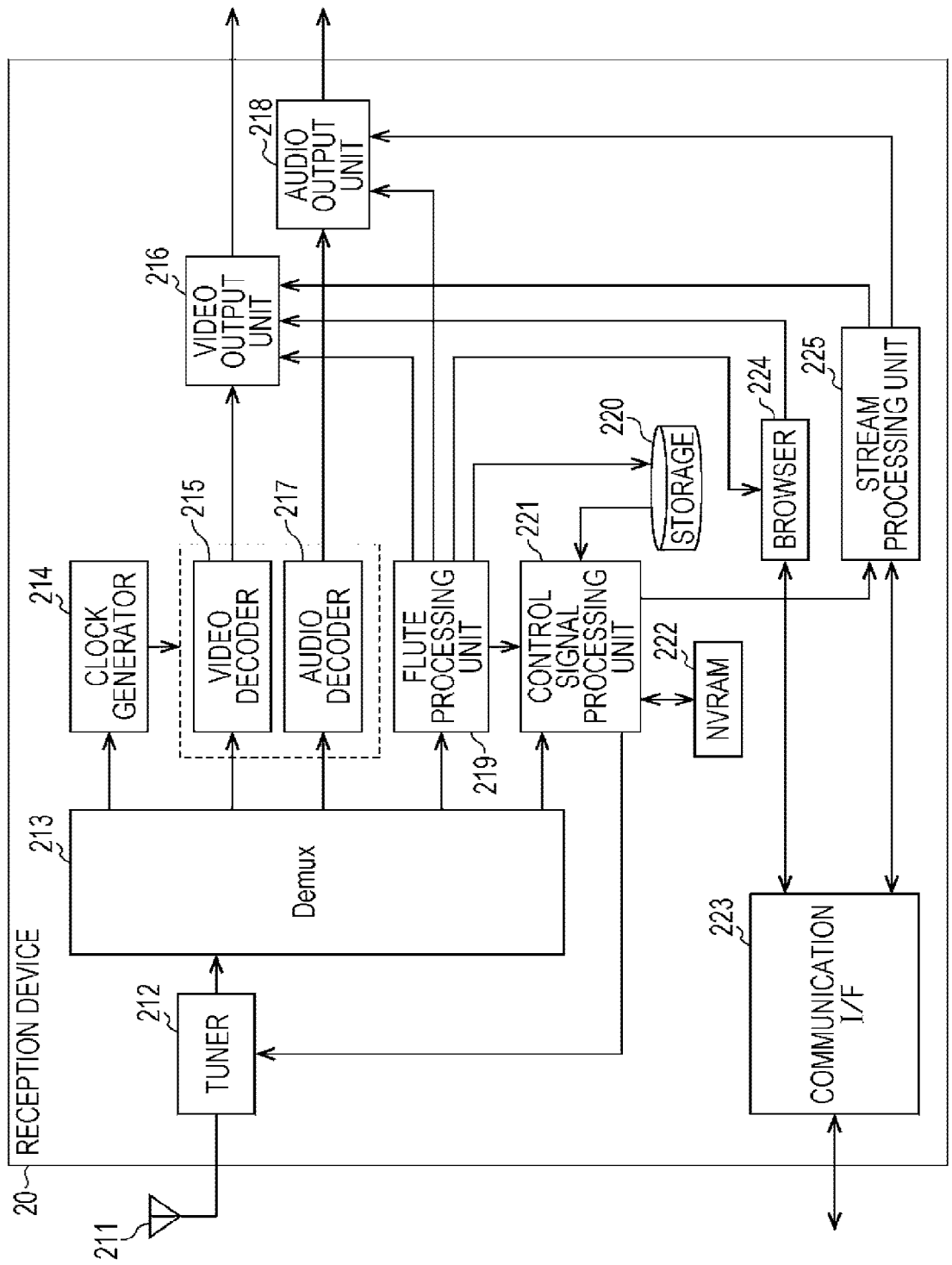
FIG. 10 is a diagram illustrating a configuration according to an embodiment of a reception device to which the present technology is applied.

FIG. 10 is a diagram illustrating a configuration according to an embodiment of the reception device to which the present technology is applied.

As illustrated in FIG. 10, the reception device 20 includes a tuner 212, a Demux 213, a clock generator 214, a video decoder 215, a video output unit 216, an audio decoder 217, an audio output unit 218, a FLUTE processing unit 219, a storage 220, a control signal processing unit 221, a NVRAM 222, a communication I/F 223, a browser 224, and a stream processing unit 225.

The tuner 212 extracts and demodulates a broadcast signal of a service, to which a channel selection is indicated, from a broadcast signal received by the antenna 211 and supplies the resulting BBP stream of IP transfer format to the Demux 213.

The Demux 213 de-multiplexes the BBP stream of IP transfer format supplied from the tuner 212 into video data, audio data, file data, and a control signal and supplies them to the video decoder 215, the audio decoder 217, the FLUTE processing unit 219, and the control signal processing unit 221, respectively. In addition, the Demux 213 supplies time information (NTP) obtained from the BBP stream to the clock generator 214.

The clock generator 214 generates a clock signal based on the NTP supplied from the Demux 213 and supplies the generated clock signal to the video decoder 215 and the audio decoder 217.

The video decoder 215 decodes the video data supplied from the Demux 213 using a decoding scheme corresponding to the video encoder 112 (FIG. 9), based on the clock signal supplied from the clock generator 214, and supplies the decoded video data to the video output unit 216. The video output unit 216 outputs the video data supplied from the video decoder 215 to a display (not illustrated) of the back stage. Thus, for example, the video such as a TV program is displayed on the display.

The audio decoder 217 decodes the audio data supplied from the Demux 213 using a decoding scheme corresponding to the audio encoder 114 (FIG. 9), based on the clock signal supplied from the clock generator 214, and supplies the decoded audio data to the audio output unit 218. The audio output unit 218 supplies the audio data supplied from the audio decoder 217 to a loudspeaker (not illustrated) of the back stage. Thus, for example, the audio corresponding to the video of the TV program is output from the loudspeaker.

The FLUTE processing unit 219 restores the video data or audio data, the control signal (SCS), the ESG, the application, the content or the like which are supplied from the Demux 213 from the file data transferred by the FLUTE session. The FLUTE processing unit 219 supplies the restored video data to the video output unit 216 and supplies the restored audio data to the audio output unit 218. Thus, the video such as the TV program is displayed on the display and the audio corresponding to the video is output from the loudspeaker.

In addition, the FLUTE processing unit 219 supplies the restored control signal (SCS) to the control signal processing unit 221. Moreover, the FLUTE processing unit 219 records the restored ESG or content in the storage 220 or supplies the restored application to the browser 224.

The storage 220 is a large-capacity recording device such as a hard disk drive (HDD). The storage 220 records various data such as the content supplied from the FLUTE processing unit 219 or the like.

The control signal processing unit 221 control the operation of each unit based on the control signal (LLS (SCT and SAT) and SCS) supplied from the Demux 213 or the FLUTE processing unit 219. The NVRAM 222 is a nonvolatile memory in which various data are recorded in accordance with control from the control signal processing unit 221. For example, the channel selection information (SCT) is recorded in the NVRAM 222 by an initial scan processing, and the control signal processing unit 221 controls the channel selection processing by the tuner 212 in accordance with the channel selection information (SCT) read out from the NVRAM 222.

The communication I/F 223 receives an application from an application server (not illustrated) provided on the internet 90 and supplies the received application to the browser 224. The application is supplied to the browser 224 from the FLUTE processing unit 219 or the communication I/F 223. The browser 224 generates the video data depending on the application made up of an HTML document described by, for example, a hyper text markup language 5 (HTML5) and supplies the generated video data to the video output unit 216. Thus, the video of the application is displayed on the display.

In addition, the communication I/F 223 receives data of communication content delivered from the delivery server 30 provided on the internet 90 and supplies the received data to the stream processing unit 225. In accordance with the control from the control signal processing unit 221, the stream processing unit 225 performs predetermined reproduction processing on the data of the communication content supplied from the communication I/F 223 and supplies the resulting video data to the video output unit 216 and supplies the resulting audio data to the audio output unit 218. Thus, the video of the communication content is displayed on the display.

Further, the audio of the communication content is output from the loudspeaker.

Further, FIG. 10 illustrates that the storage 220 is built in the reception device 20; however, an external storage may be connected to the reception device.

<4. Concrete Operation Eamples>

Next, a concrete operation example of the broadcasting system to which the present technology is applied will be disclosed. However, since the channel selection processing of the reception device 20 is mainly disclosed in the operation example, the channel selection information (SCT) is assumed to have been already acquired by initial scan processing. Hereinafter, operation examples 1 to 4 will be disclosed in this order.

(1) OPERATION EXAMPLE 1

(Channel Selection Processing of Operation Example 1)

Figure 11:
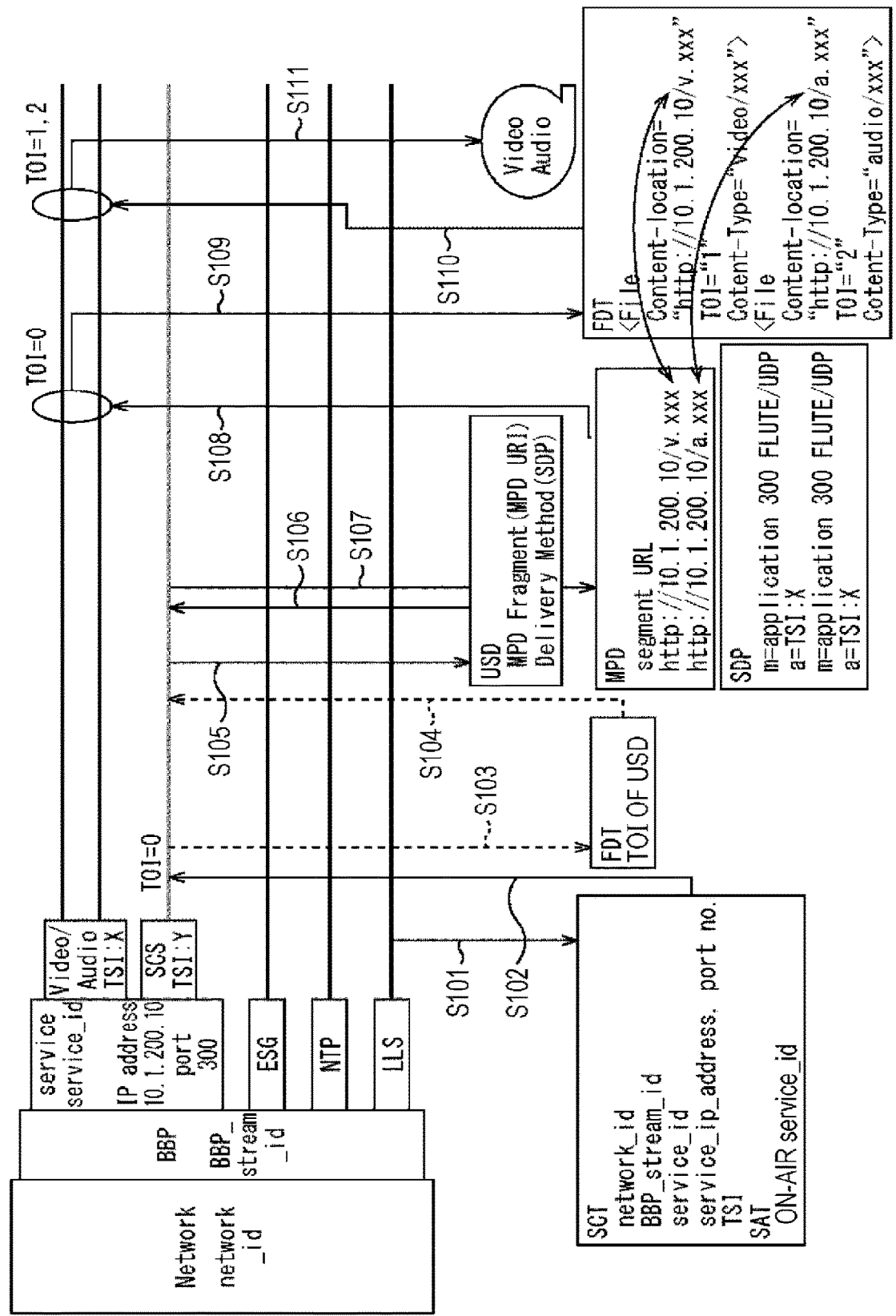
FIG. 11 is a diagram illustrating channel selection processing according to Operation Example 1.

As illustrated in FIG. 11, in Operation Example 1, since the video data/audio data are transferred in an asynchronous file format in the broadcast waves of the digital broadcasting transmitted from the transmission device 10, the FLUTE session is used. In addition, the video data/audio data are transferred by the same FLUTE session; however, the SCS is transferred by another FLUTE session. In the video data/audio data and the SCS, for example, the IP addresses and the port numbers are the same to be "10.1.200.10" and "300", respectively; however, the TSIs differ as "X" and "Y".

In the reception device 20, when an channel selection operation is detected by the viewer, the channel selection information (SCT) recorded in the NVRAM 222 is read out by the control signal processing unit 221 and the tuner 212 performs the channel selection processing according to the SCT. In addition, the control signal processing unit 221 acquires the SAT sent at a predetermined period as the LLS and determines whether a specific service is on-air by collating service_id of the channel-selected specific service and service_id of the service included in the SAT (S101).

The FLUTE processing unit 219 acquires a file delivery table (FDT) transferred periodically by the specific FLUTE session (TSI: Y) using SCS_bootstrap information of the SCT according to the service_id of the specific service when the specific service is on-air (S102 and S103). Meanwhile, a specific file is designated in the FLUTE session using a transport session identifier (TSI) and a transport object identifier (TOI); however, the FDT is designated by TOI=0. The FLUTE processing unit 219 acquires an USD transferred by the specific FLUTE session (TSI: Y) in accordance with the TOI of the USD obtained with reference to index information of the FDT (S104 and S105).

The FLUTE processing unit 219 acquires MPD and SDP transferred by the specific FLUTE session (TSI: Y) in accordance with information (Media Presentation Description, Delivery Method) for acquiring the MPD and SDP included in the USD (S106 and S107). Here, a segment URL for each component is described in the MPD. Specifically, as the segment URL, "http://10.1.200.10/v.xxx" and "http://10.1.200.10/a.xxx" are described.

In addition, a type, a port number, a protocol, and a TSI for each component are described in the SDP. In the SDP, specifically, two components having an application type are transferred by the specific FLUTE session (TSI: X); however, since the video data/audio data are designated as the same application type, the video data/audio data transferred by the FLUTE session may not be designated from the SDP.

The FLUTE processing unit 219 acquires the FDT transferred periodically by the specific FLUTE session (TSI: X) in accordance with the SDP (S108 and S109). The index information is described in the FDT to acquire the video data/audio data. Specifically, the video data is designated by TOI=1 in the specific FLUTE session (TSI: X), and the audio data is designated by TOI=2 in the specific FLUTE session (TSI: X). Then, the FLUTE processing unit 219 can derive the TOI of the video data/audio data by collating the segment URL of the MPD and the Content-location URL of the FDT to acquire these data (components) (S110 and S111).

In the case of Operation Example 1, since the video data/audio data are transferred by the same FLUTE session, that is, the broadcasting, the segment URL of the MPD and the Content-location URL of the FDT totally coincide with each other. In contrast, when the video data/audio data are transferred by the communication, the segment URL of the MPD is described as an URL; however, the URLs of the data, which are not transferred by the FLUTE session, are not described in the FDT. Accordingly, when the component type and the transfer type value are not disposed in the extension of the SGDU, it will not be understood until the component is transferred by the communication by the collation of the above-disclosed URLs.

Therefore, as illustrated in FIG. 4, the present technology is configured to obtain the component type and the transfer system at the time of acquisition of the MPD by disposing the component type and the transfer type value in the extension of the SGDU which transfers the MPD. For this reason, for example, according to the case of Operation Example 1, when the video data/audio data are transferred by the communication, it is possible to obtain information indicating that the component is transferred by the communication without the acquisition of the FDT which is transferred by the specific FLUTE session (TSI: X).

(Protocol Stack of Operation Example 1)

Figure 12:
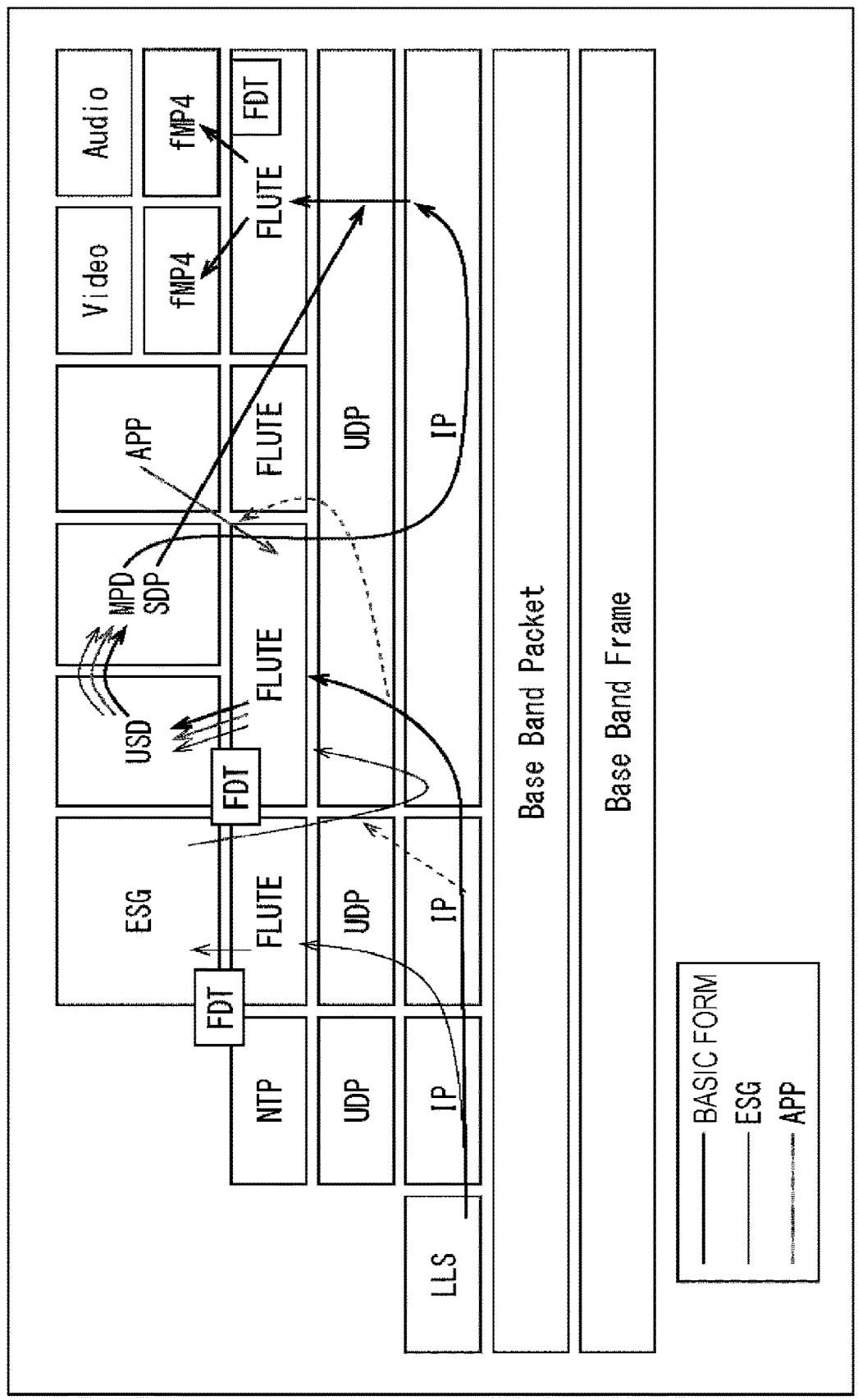
FIG. 12 is a diagram illustrating a protocol stack according to Operation Example 1.

FIG. 12 is a diagram illustrating a protocol stack of the digital broadcasting of the IP transfer system according to Operation Example 1.

As illustrated in FIG. 12, the lowermost layer is a base band frame, a base band packet storing various data in the IP transfer system is transferred onto the base band frame. Higher layers adjacent to such a BBP stream are an LLS and an IP layer. The LLS is low layer signaling information and, for example, includes service configuration information such as the SCT or SAT.

The IP layer is the same as an internet protocol (IP) in the protocol stack of TCP/IP, and IP packet is designated by the IP address. A higher layer adjacent to the IP layer is an UDP layer, and higher layers of the UDP layer are FLUTE and NTP. That is, in the digital broadcasting of the IP transfer system, a packet in which the UDP port number is designated is transferred and the FLUTE session is established.

In addition, higher layers adjacent to the FLUTE are an ESG, a USD, an MPD, an SDP, an APP (application), and an fMP4 (Fragmented MP4), and the ESG, USD, MPD, SDP, and APP are transferred by the FLUTE session. Further, a higher layer adjacent to the fMP4 is video data (Video) and audio data (Audio). That is, when the video data or the audio data is transferred in the asynchronous file format, the FLUTE session is used.

In the protocol stack of FIG. 12, three kinds of lines are indicated to illustrate the flow of acquisition and reproduction of the component when the channel selection is instructed from the ESG or APP in addition to a basic form when the channel selection is instructed by operation of, for example, a remote controller or the like.

In the basic form, first, the LLS transferred onto the BBP stream is acquired and the USD is acquired based on the index information of the FDT transferred periodically in the specific FLUTE session (TSI: Y) using SCS bootstrap information included in the SCT. In addition, the MPD and SDP transferred by the specific FLUTE session (TSI: Y) are acquired in accordance with the acquired USD. Then, in Operation Example 1, since the video data/audio data are transferred by the same FLUTE session, the video data/audio data transferred by the specific FLUTE session (TSI: X) are acquired in accordance with the SDP.

In addition, when the ESG is used, since the USD of the specific service selected from the ESG is acquired from the FLUTE session that is another FLUTE session, the LLS is acquired and then the USD is acquired based on the LLS. The flow after the USD acquisition is the same as in the basic form. Further, when the APP is used, a specific service is selected from a browser application (APP). In this case, it is possible to acquire the USD by, for example, preparing a script for the purpose of acquiring the USD of the selected specific service in the application. The flow after the USD acquisition is the same as in the basic form.

(Relevance of Information Included in Control Signal of Operation Example 1)

Figure 13:
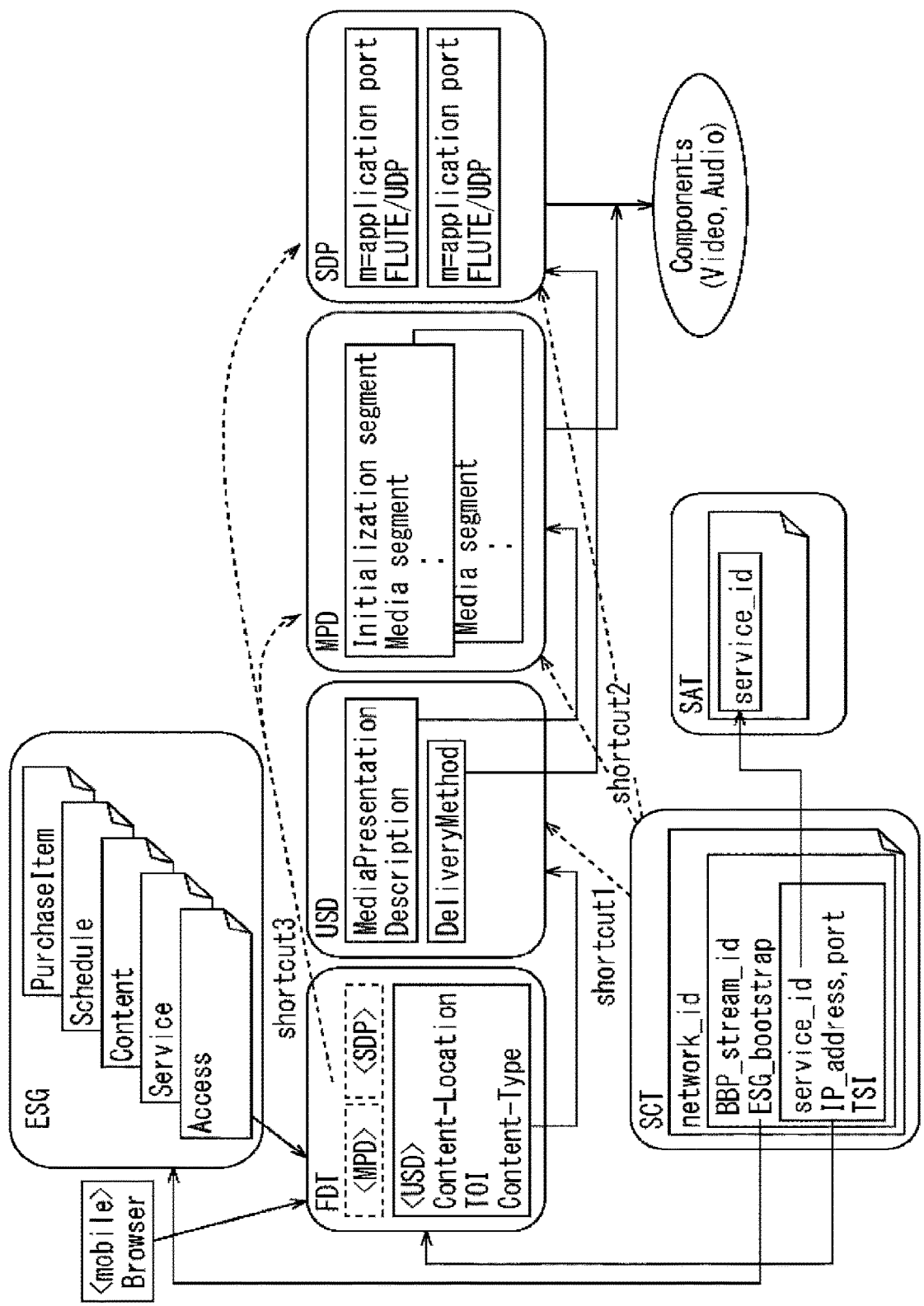
FIG. 13 is a diagram illustrating relevance of information included in a control signal according to Operation Example 1.

FIG. 13 is a diagram illustrating relevance of information included in a control signal according to Operation Example 1.

As illustrated in FIG. 13, the SCT indicates the BBP stream configuration and the service configuration within the broadcasting network by the triplet. In addition to the network_id, the BBP stream loop identified by the BBP_stream_id is disposed in the SCT. Further, in addition to an ESG_bootstrap, a service loop identified by the service_id is disposed in the BBP stream loop. Further, an IP address or a port number and TSI (SCS_bootstrap information) of each service are disposed in the service loop. Although not illustrated, the SCT includes, for example, information on a physical layer or the like, which is used as channel selection information.

The SCT and the SAT are associated with each other by the service_id and can determine whether the specific service is on-air. It is possible to access an ESG using ESG_bootstrap information for each BBP_stream_id of the SCT. In addition, it is possible to access an FDT from the ESG.

Further, it is possible to acquire an FDT transferred by the specific FLUTE session (TSI: Y) using the SCS_bootstrap information for each service_id of the SCT. Then, it is possible to acquire the USD transferred by the specific FLUTE session (TSI: Y) in accordance with the index information of this FDT. Further, the MPD and SDP transferred by the specific FLUTE session (TSI: Y) are acquired in accordance with information (Media Presentation Description, Delivery Method) for the purpose of acquiring the MPD and SDP included in the USD.

Then, when all of the components constituting the service are transferred by the broadcasting, since information on the component is described in the SDP, it is possible to acquire the video data/audio data transferred by the specific FLUTE session (TSI: X) in accordance with the SDP to reproduce the information.

Further, when the components constituting the service are transferred by the broadcasting and the communication, since the information on the component is described in the SDP and MPD, it is possible to acquire the component from the specific FLUTE session in accordance with the SDP and to further acquire the component by accessing the delivery server 30 in accordance with the segment URL of the MPD.

Further, in the relevance of the information illustrated in FIG. 13, the TOI of the USD, MPD, and SDP is set as a fixed value and then the value of the TOI may be described in the SCT. When such an operation is employed, it is possible to access the USD from the SCT without passing the FDT ("shortcut1" in the drawing). In addition, it is possible to access the MPD and SDP from the SCT without passing the FDT and USD ("shortcut2" in the drawing). Moreover, in the relevance of the information illustrated in FIG. 13, it is possible to access the MPD and SDP without passing the USD by allowing the FDT to include information ("<MPD>" and "<SDP>" surrounded by dotted lines in the drawing) indicating an acquisition destination of the MPD and SDP ("shortcut3" in the drawing).

(2) OPERATION EXAMPLE 2

(Channel Selection Processing of Operation Example 2)

Figure 14:
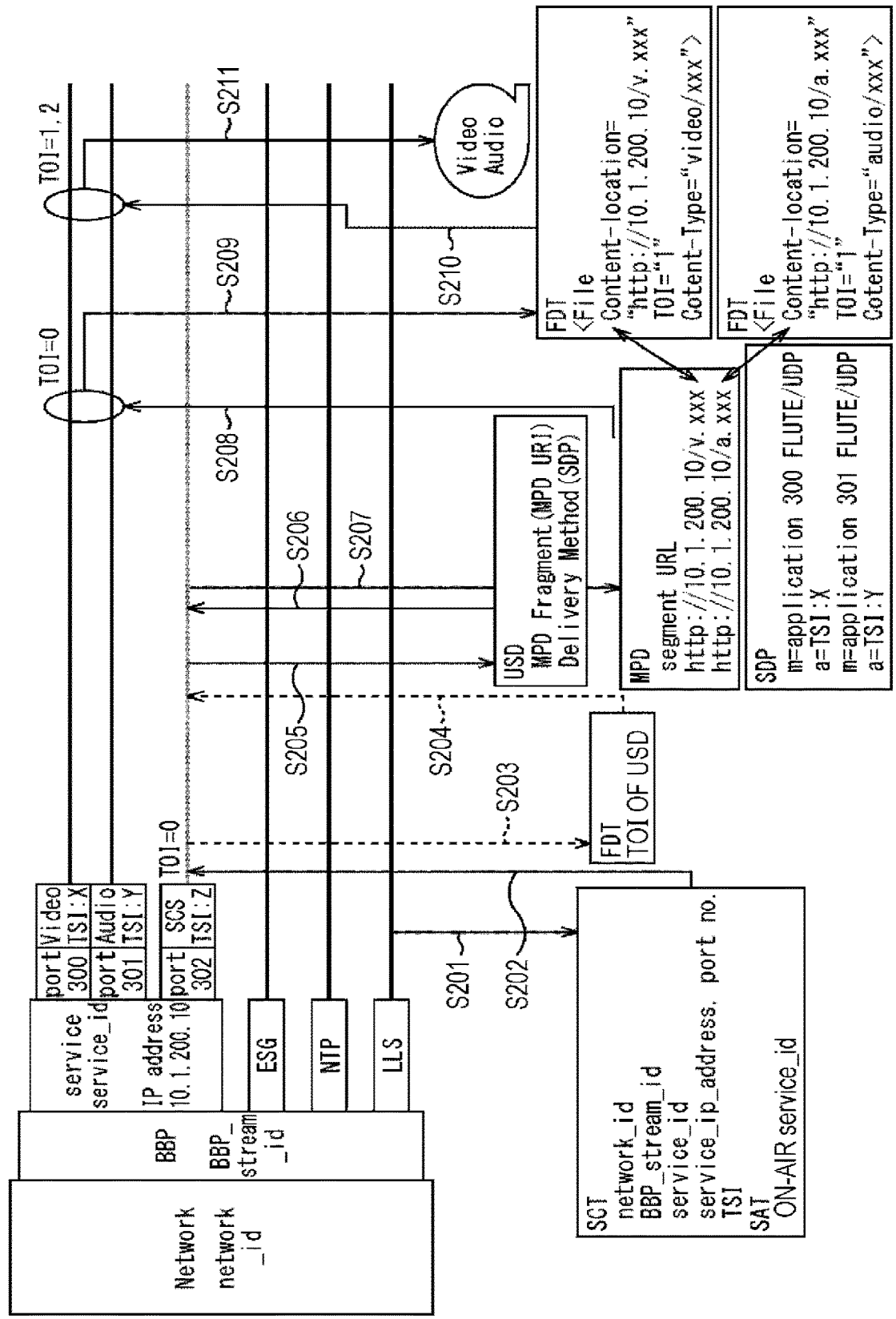
FIG. 14 is a diagram illustrating channel selection processing according to Operation Example 2.

As illustrated in FIG. 14, in Operation Example 2, since the video data/audio data are transferred in an asynchronous file format in the broadcast waves of the digital broadcasting transmitted from the transmission device 10, the FLUTE session is used. In addition, each of the video data, audio data, and the SCS is transferred by different FLUTE sessions. In the video data, the audio data, and the SCS, for example, the IP address is the same to be "10.1.200.10"; however, the port numbers are "300", "301", and "302" which are different from each other and the TSIs are "X", "Y", and "Z" which are different from each other.

In the reception device 20, when the channel selection operation is detected by the viewer, the channel selection information (SCT) is read out and the channel selection processing is performed depending on the SCT. In addition, the SAT is acquired from the LLS and it is determined whether the channel-selected specific service is on-air (S201). When the specific service is on-air, the FDT is acquired from a specific FLUTE session (TSI: Z) using the SCS_bootstrap information of the SCT (S202 and S203). In addition, the USD is acquired from the specific FLUTE session (TSI: Z) in accordance with the index information of the FDT (S204 and S205).

When the USD is acquired, MPD and SDP transferred by the specific FLUTE session (TSI: Z) are acquired in accordance with information for acquiring the MPD and SDP (S206 and S207). A segment URL for each component is described in the MPD. In addition, type, port number, protocol, and TSI for each component are described in the SDP; however, since the video data/audio data are transferred by different FLUTE sessions, the port numbers (300 and 301) and the TOIs (X and Y) have different values, respectively.

In the SDP, however, the fact that two components having an application type are transferred by these different FLUTE sessions (TSI: X and Y) is described. However, since the video data/audio data are designated as the same application type, the video data/audio data transferred by the FLUTE session may not be designated from the SDP. Accordingly, it is possible to acquire the FDT for each FLUTE session by accessing two FLUTE sessions (TSI: X and Y) in accordance with the SDP; however, the distinction between the video data and the audio data is not performed at this time (S208 and S209).

In two FDTs acquired in this way, index information for acquiring the video data is described in one FDT and index information for acquiring the audio data is described in the other FDT. Specifically, the video data is designated by TOI=1 in the specific FLUTE session (TSI: X), and the audio data is designated by TOI=2 in the specific FLUTE session (TSI: Y). Then, it is possible to obtain an acquisition destination of the video data/audio data by collating the segment URL of the MPD and the Content-location URLs of two FDTs and thus to acquire these data (components) (S210 and S211).

In the case of Operation Example 2, since the video data/audio data are transferred by the different FLUTE sessions, that is, the broadcasting, both the segment URL of the MPD and the Content-location URLs of two FDTs coincide with each other. In contrast, when the video data/audio data are transferred by the communication, the segment URL of the MPD is described as an URL; however, the URL of these data, which are not transferred by the FLUTE session, are not described in the FDT. Accordingly, when the component type and the transfer type value are not disposed in the extension of the SGDU, it will be understood that the component is transferred by the communication for the first time by the collation of the above-disclosed URLs.

Therefore, as illustrated in FIG. 4, the present technology is configured to obtain the component type and the transfer system at the time of acquisition of the MPD by disposing the component type and the transfer type value in the extension of the SGDU which transfers the MPD. For this reason, for example, according to the case of Operation Example 2, when the video data/audio data are transferred by the communication, it is possible to obtain information indicating that the component is transferred by the communication without the acquisition of the FDTs which are transferred by the specific FLUTE sessions (TSI: X and Y).

(Protocol Stack of Operation Example 2)

Figure 15:
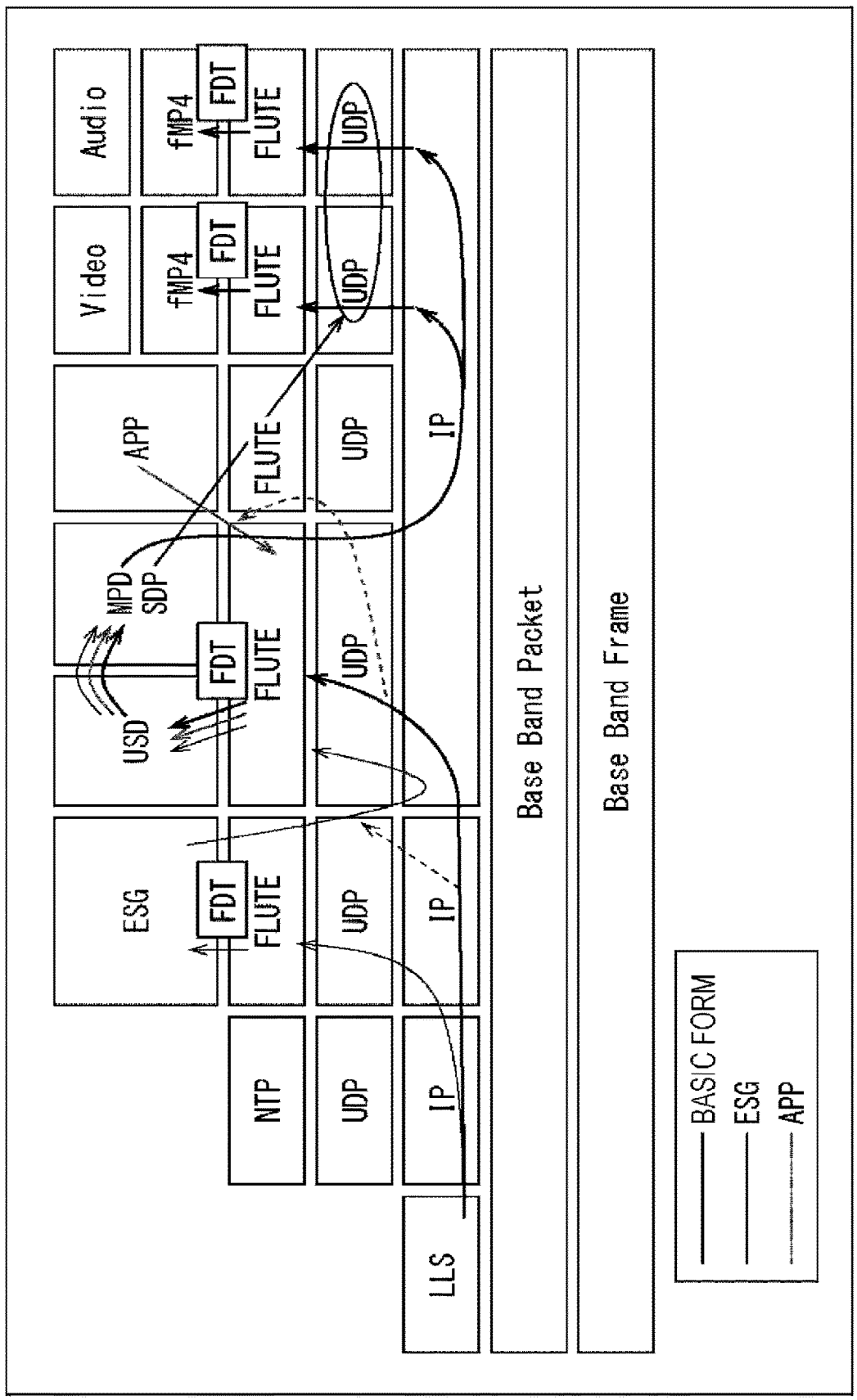
FIG. 15 is a diagram illustrating a protocol stack according to Operation Example 2.

FIG. 15 is a diagram illustrating a protocol stack of the digital broadcasting of the IP transfer system according to Operation Example 2.

Unlike Operation Example 1, since Operation Example 2 is configured to transfer the video data/audio data using the different FLUTE sessions (TSI: X and Y), protocols of FLUTE/UDP which are lower layers of the video data and the audio data are different from each other. As disclosed above, two FDTs are acquired for each FLUTE session, the video data transferred by the FLUTE session (TSI: X) is acquired depending on one FDT, and the audio data transferred by the FLUTE session (TSI: Y) is acquired depending on the other FDT.

Further, in the protocol stack of FIG. 15 according to Operation Example 2, since other layers are similar to those in the protocol stack of FIG. 12, the description thereof will be not presented.

(Relevance of Information Included in Control Signal of Operation Example 2)

Figure 16:
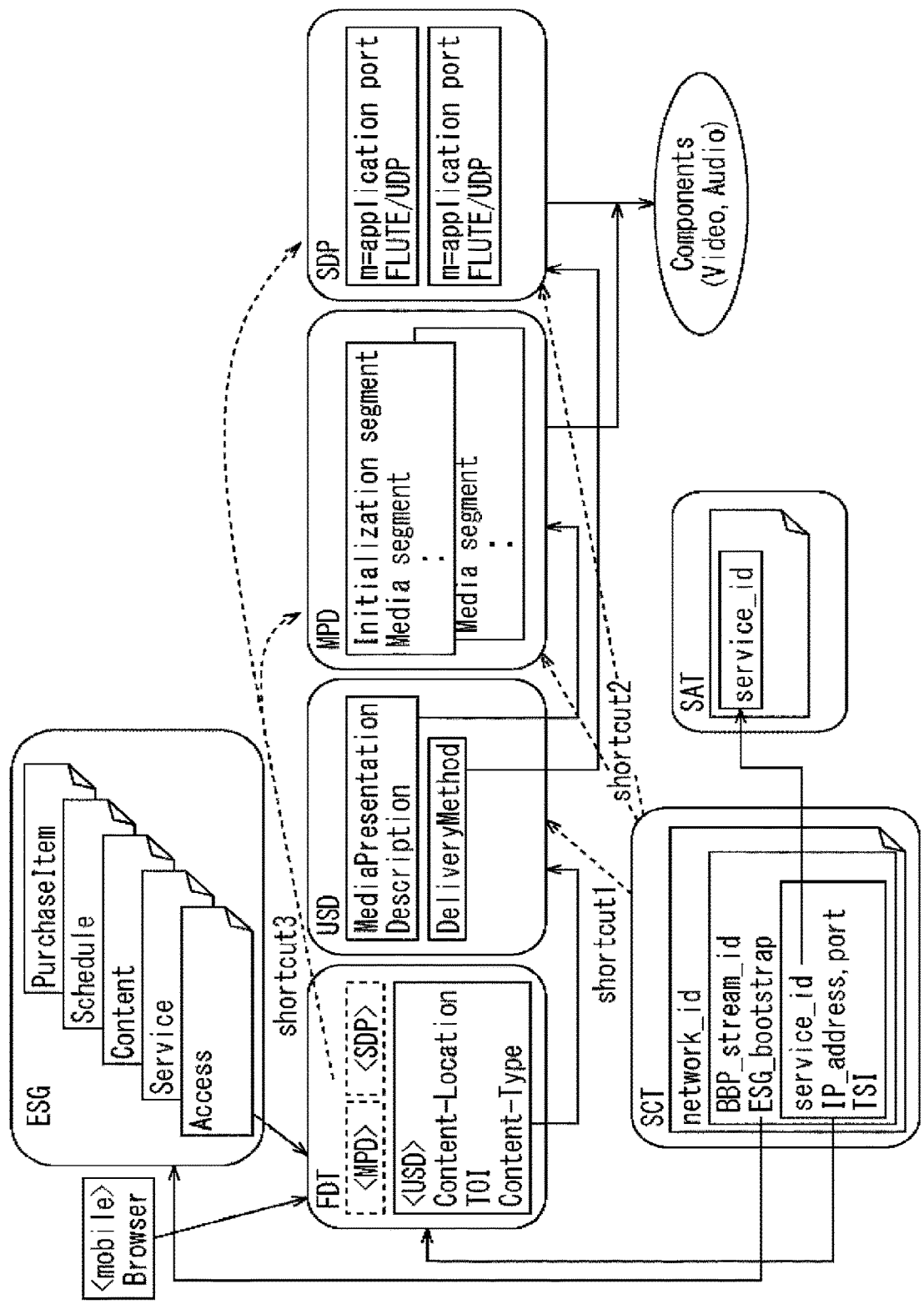
FIG. 16 is a diagram illustrating relevance of information included in a control signal according to Operation Example 2.

FIG. 16 is a diagram illustrating relevance of information included in a control signal according to Operation Example 2.

Unlike Operation Example 1, since Operation Example 2 is configured to transfer the video data/audio data using the different FLUTE sessions (TSI: X and Y), the port numbers designated by each application are 300 and 301 which are different from each other in the SDP.

Further, as in Operation Example 1, since Operation Example 2 is configured such that the TOI of the USD, MPD, and SDP is set as a fixed value and then the value of the TOI may be described in the SCT, as illustrated in FIG. 16, it is possible to access the USD from the SCT without passing the FDT ("shortcut1" in the drawing). In addition, it is possible to access the MPD and SDP from the SCT without passing the FDT and USD ("shortcut2" in the drawing). Moreover, it is possible to access the MPD and SDP without passing the USD by allowing the FDT to include information ("<MPD>" and "<SDP>" surrounded by dotted lines in the drawing) indicating an acquisition destination of the MPD and SDP ("shortcut3" in the drawing).

Further, in the relevance of the information of FIG. 16 according to Operation Example 2, since the relevance of the information other than the above description is similar to the relevance of the information of FIG. 13 according to Operation Example 1, the description thereof will be not presented.

(3) OPERATION EXAMPLE 3

(Channel Selection Processing of Operation Example 3)

Figure 17:
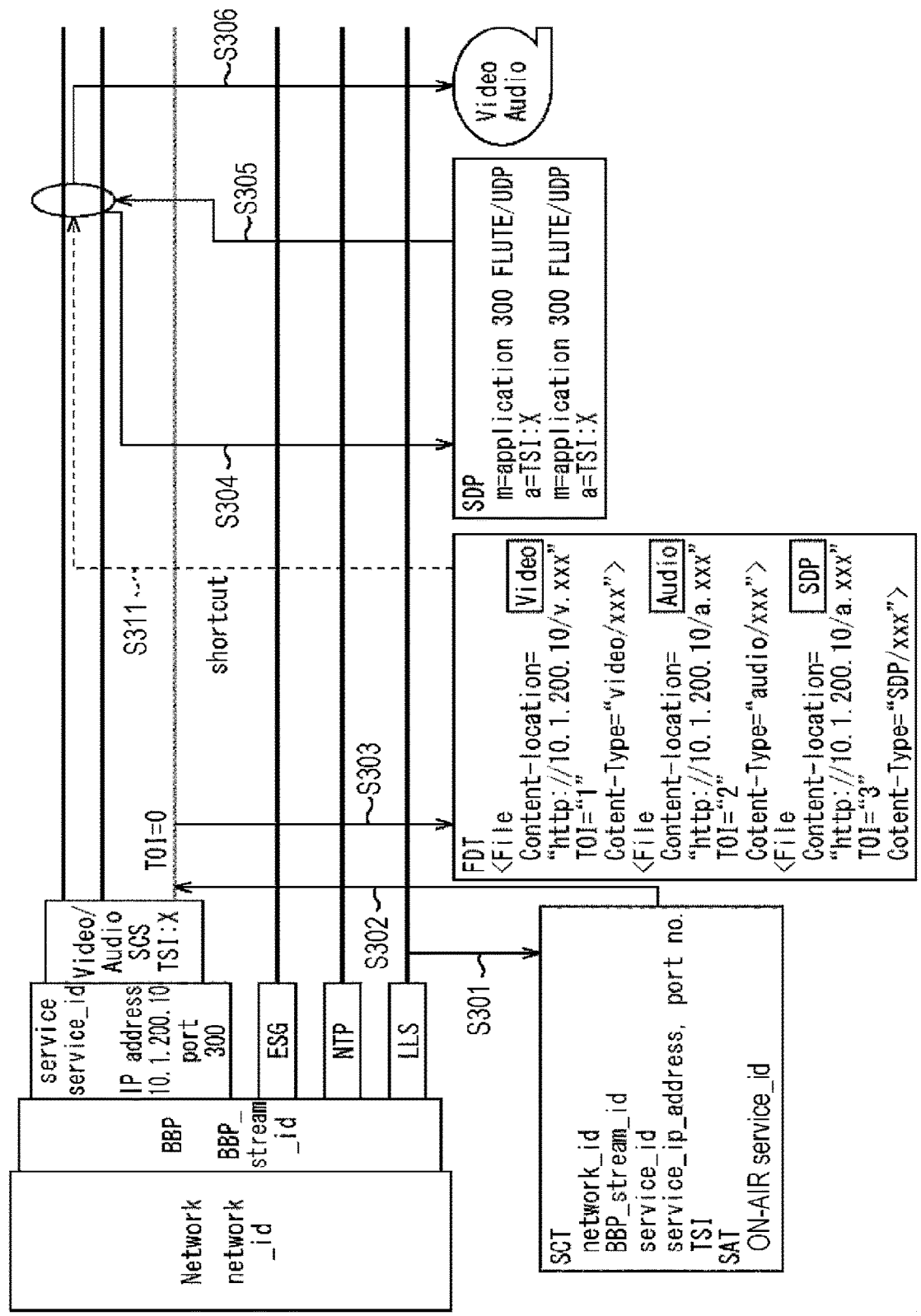
FIG. 17 is a diagram illustrating channel selection processing according to Operation Example 3.

As illustrated in FIG. 17, in Operation Example 3, since the video data/audio data are transferred in an asynchronous file format in the broadcast waves of the digital broadcasting transmitted from the transmission device 10, the FLUTE session is used. In addition, the video data, the audio data, and the SCS are transferred by the same FLUTE session. In the video data, the audio data, and the SCS, for example, the IP address, the port number, and the TSI are the same to be "10.1.200.10", "300", and "X", respectively.

In the reception device 20, when the channel selection operation is detected by the viewer, the channel selection information (SCT) is read out and the channel selection processing is performed depending on the channel selection information. In addition, the SAT is acquired from the LLS and it is determined whether the channel-selected specific service is on-air (S301). Then, when the specific service is on-air, the FDT is acquired from the specific FLUTE session (TSI: X) using the SCS bootstrap information of the SCT (S302 and S303). The index information is described in the FDT to acquire the video data/audio data transferred by the FLUTE session (TSI: X) and the SDP. Specifically, the video data is designated by TOI=1, the audio data is designated by TOI=2, and the SCS is designated by TOI=3.

In this case, it is possible to access the video data or the audio data depending on the index information of the FDT (S311, "shortcut" in the drawing); however, there is no saying what kind of the video data or audio data is accessed, so it is necessary to acquire the SDP in which detailed information of the component is described (S304 and S305). Here, as the detailed information of the component, for example, a mime-type or the like of the component is described. Then, it is possible to recognize the same FLUTE session as the SCS through the FDT and SDP, to derive the TOI of the video data/audio data by collating the segment URL of the MPD and the Content-location URL of the FDT, and thus to acquire these data (components) (S306).

(Protocol Stack of Operation Example 3)

Figure 18:
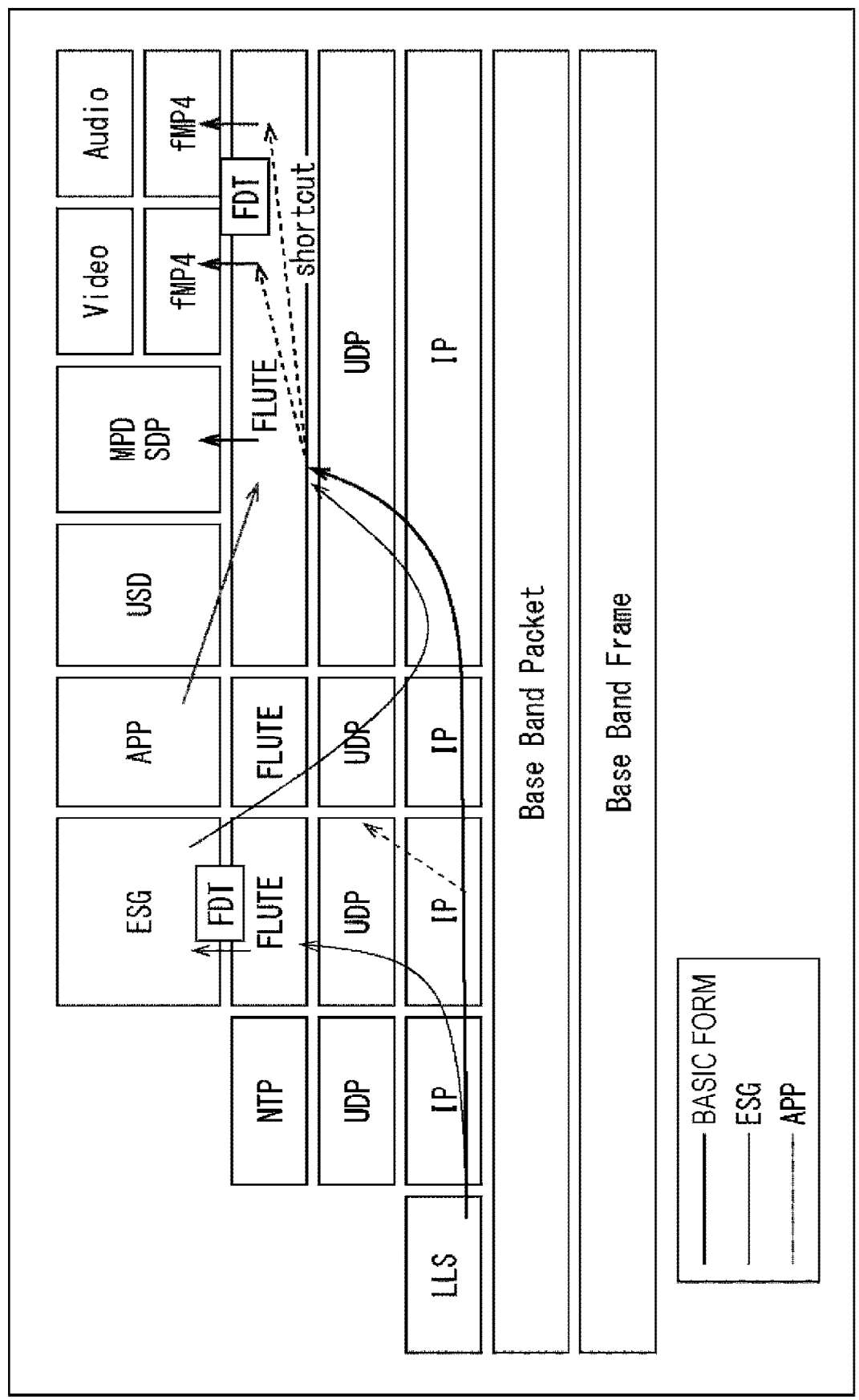
FIG. 18 is a diagram illustrating a protocol stack according to Operation Example 3.

FIG. 18 is a diagram illustrating a protocol stack of the digital broadcasting of the IP transfer system according to Operation Example 3.

Unlike Operation Example 1 and Operation Example 2, since Operation Example 3 is configured to transfer the video data, audio data, and SCS using the same FLUTE session (TSI: X), protocols of FLUTE/UDP are equal to each other. Therefore, when the FDT of the specific FLUTE session (TSI: X) is acquired, it is possible to access the video data, the audio data, and the SDP using the FDT.

Further, in the protocol stack of FIG. 18 according to Operation Example 3, since other layers are similar to those in the protocol stack of FIG. 12, the description thereof will be not presented.

(Relevance of Information Included in Control Signal of Operation Example 3)

Figure 19:
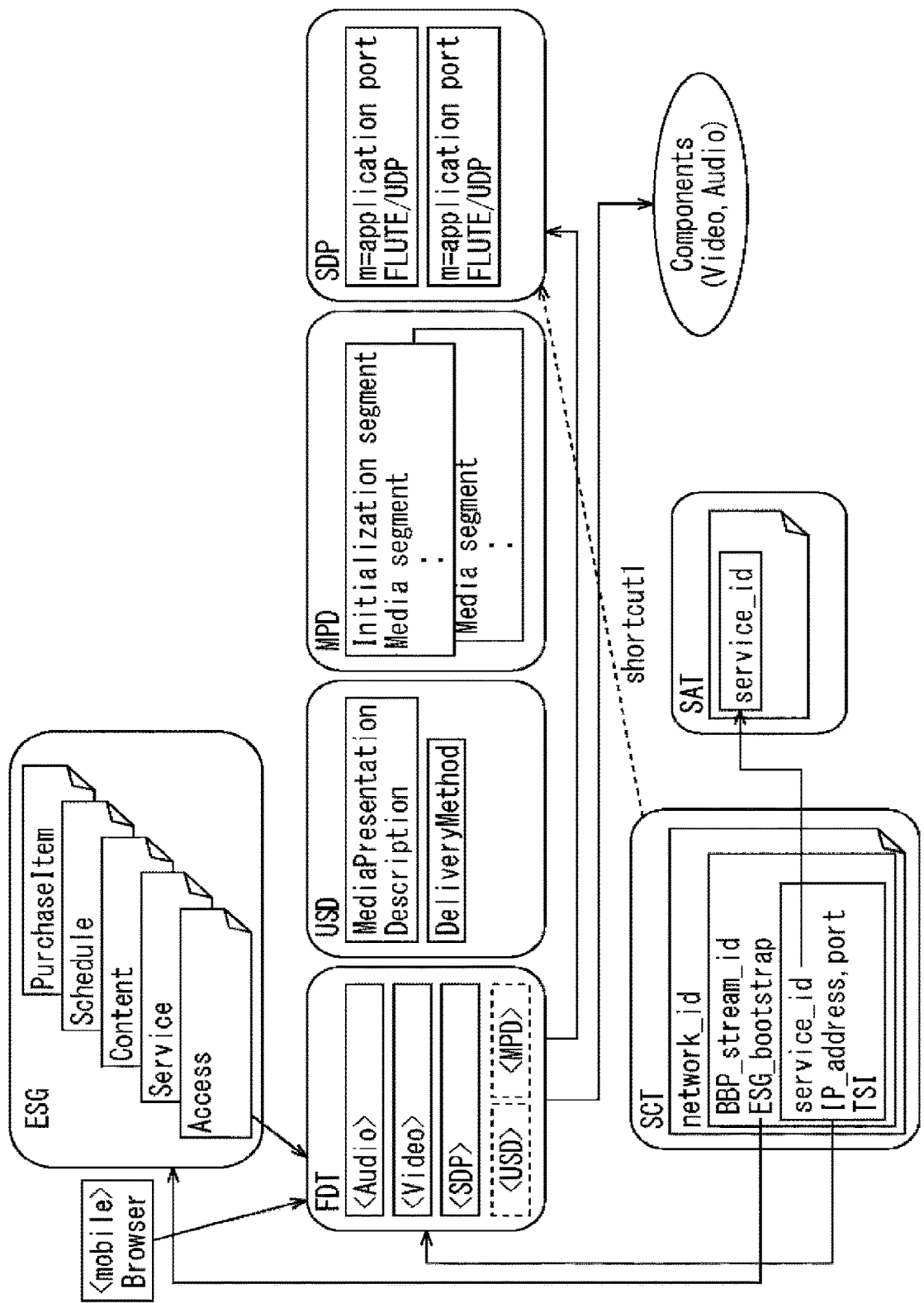
FIG. 19 is a diagram illustrating relevance of information included in a control signal according to Operation Example 3.

FIG. 19 is a diagram illustrating relevance of information included in a control signal according to Operation Example 3.

Unlike Operation Example 1 and Operation Example 2, since Operation Example 3 is configured to transfer the video data, audio data, and SCS using the same FLUTE session (TSI: X), the component or the SDP can be directly indicated from the FDT of the specific FLUTE session (TSI: X)

In addition, as illustrated in FIG. 19, since Operation Example 3 is configured such that the TOI of the SDP is set as a fixed value and then the value of the TOI is described in the SCT, it is possible to directly access the SDP from the SCT ("shortcutl" in the drawing).

(4) OPERATION EXAMPLE 4

(Channel Selection Processing of Operation Example 4)

Figure 20:
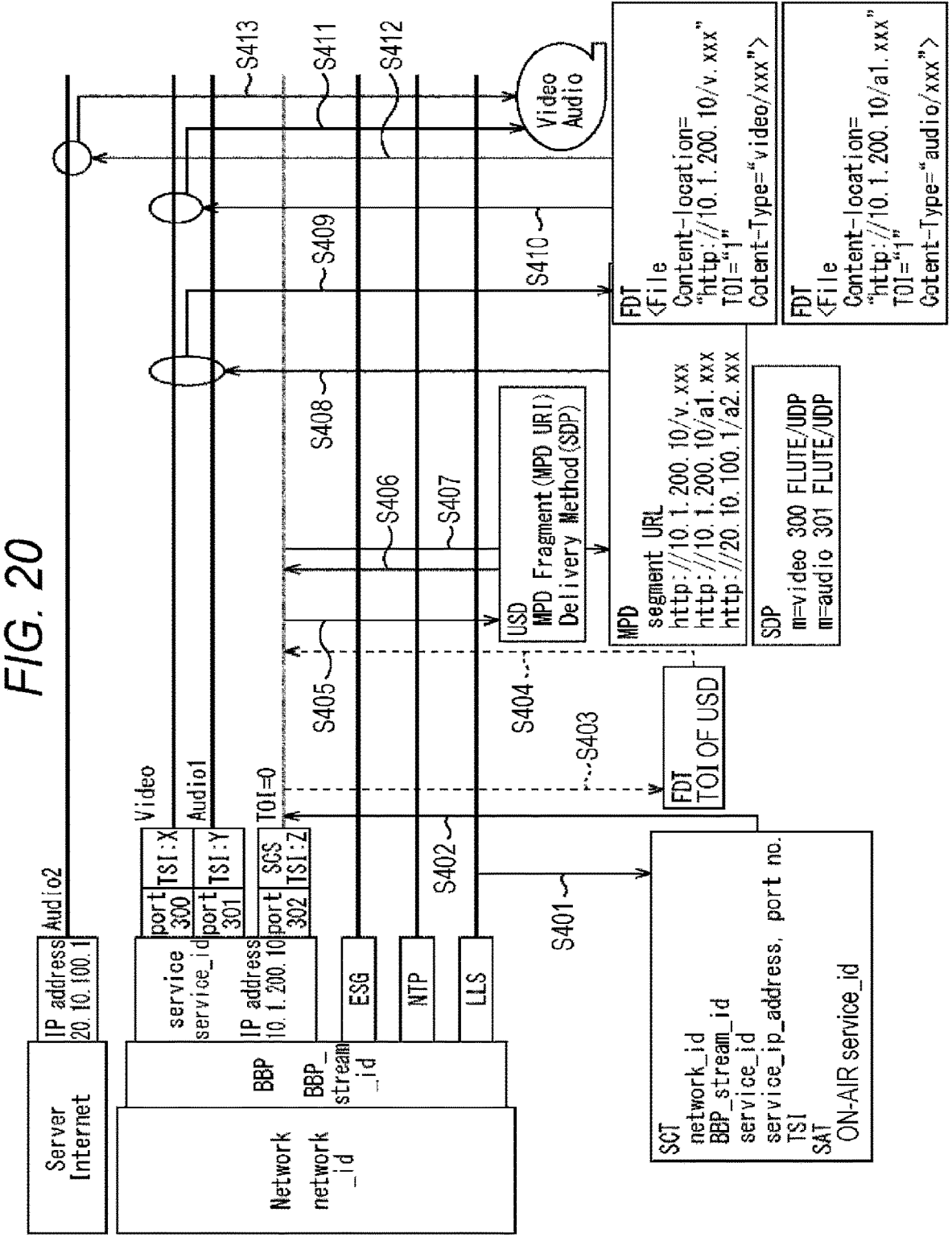
FIG. 20 is a diagram illustrating channel selection processing according to Operation Example 4.

As illustrated in FIG. 20, since the video data/audio data are transferred in an asynchronous file format in the broadcast waves of the digital broadcasting transmitted from the transmission device 10, the FLUTE session is used in Operation Example 4. In addition, the video data/audio data and the SCS are transferred by different FLUTE sessions, respectively. In the video data/audio data and the SCS, for example, the IP address is the same to be "10.1.200.10"; however, the port numbers are "300", "301", and "302" which are different from each other and the TSIs are "X", "Y", and "Z" which are different from each other.

In Operation Example 4, further, the audio data is provided from the delivery server 30 through the internet 90. The IP address of the delivery server 30 is assumed to be "20.10.100.1". In addition, in order to distinguish the audio data, which is transferred from the transmission device 10 by the broadcasting, from the audio data, which is transferred from the delivery server 30 by the communication, it will be disclosed that the former is referred to as "audio data 1 (Audio1)" and the latter is referred to as "audio data 2 (Audio2)". For example, the audio data 1 outputs an audio in English as a first language and the audio data 2 outputs an audio in Spanish as a second language. However, the reception device 20 is set such that the second language is prioritized.

In the reception device 20, when the channel selection operation is detected by the viewer, the channel selection information (SCT) is read out and the channel selection processing is performed based on the channel selection information. In addition, the SAT is acquired from the LLS and it is determined whether the channel-selected specific service is on-air (S401). Then, when the specific service is on-air, the FDT is acquired from a specific FLUTE session (TSI: Z) using the SCS_bootstrap information of the SCT (S402 and S403). In addition, the USD is acquired from the specific FLUTE session (TSI: Z) depending on the index information of the FDT (S404 and S405).

When the USD is acquired, MPD and SDP transferred by the specific FLUTE session (TSI: Z) are acquired depending on information for acquiring the MPD and SDP (S406 and S407). A segment URL for each component is described in the MPD. Specifically, as the segment URL, "http://10.1.200.10/v.xxx", "http://10.1.200.10/a1.xxx", and "http://20.10.100.1/a2.xxx" are described.

In addition, type, port number, protocol, and TSI for each component are described in the SDP; however, the video data and the audio data 1 are transferred by different FLUTE sessions, and thus the port numbers (300 and 301) have different values. The FLUTE processing unit 219 is configured to access two FLUTE sessions (TSI: X and Y) in accordance with the SDP and to acquire the FDT for each FLUTE session (S408 and S409).

In two FDTs acquired in this way, index information for acquiring the video data is described in one FDT and index information for acquiring the audio data 1 is described in the other FDT. Specifically, the video data is designated by TOI=1 in the specific FLUTE session (TSI: X), and the audio data 1 is designated by TOI=1 in the specific FLUTE session (TSI: Y).

Then, when the segment URL of the MPD is collated with the Content-location URLs of two FDTs, the "http://10.1.200.10/v.xxx" and the "http://10.1.200.10/a1.xxx" coincide with each other; however, the "http://20.10.100.1/a2.xxx" is described in only the segment URL of the MPD. That is, the video data and the audio data 1 are transferred by the broadcasting; however, the audio data 2 is transferred by the communication.

The FLUTE processing unit 219 is configured to acquire the video data from the specific FLUTE session (TSI: X) depending on the FDT (S410 and S411). In addition, since the reception device 20 is set such that the second language is prioritized, the communication I/F 223 accesses the delivery server 30 through the internet 90 depending on the segment URL ("http://20.10.100.1/a2.xxx") of the MPD to acquire the audio data 2 (S412 and S413). Thus, in the reception device 20, a video of the video data transferred by the broadcasting is displayed on a display and an audio of audio data 2 transferred by the communication is output from a loudspeaker.

Here, when the component type and the transfer type value are not disposed in the extension of the SGDU, it will be understood that the audio data 2 is transferred by the communication for the first time by the collation of the above-disclosed URLs; however, the present technology is configured to obtain the component type and the transfer system at the time of acquisition of the MPD by disposing the component type and the transfer type value in the extension of the SGDU which transfers the MPD. For this reason, for example, according to the case of Operation Example 4, when the audio data 2 is transferred by the communication, it is possible to obtain information indicating that the component is transferred by the communication without the acquisition of the FDT which is transferred by the specific FLUTE sessions (TSI: X and Y).

(Protocol Stack of Operation Example 4)

Figure 21:
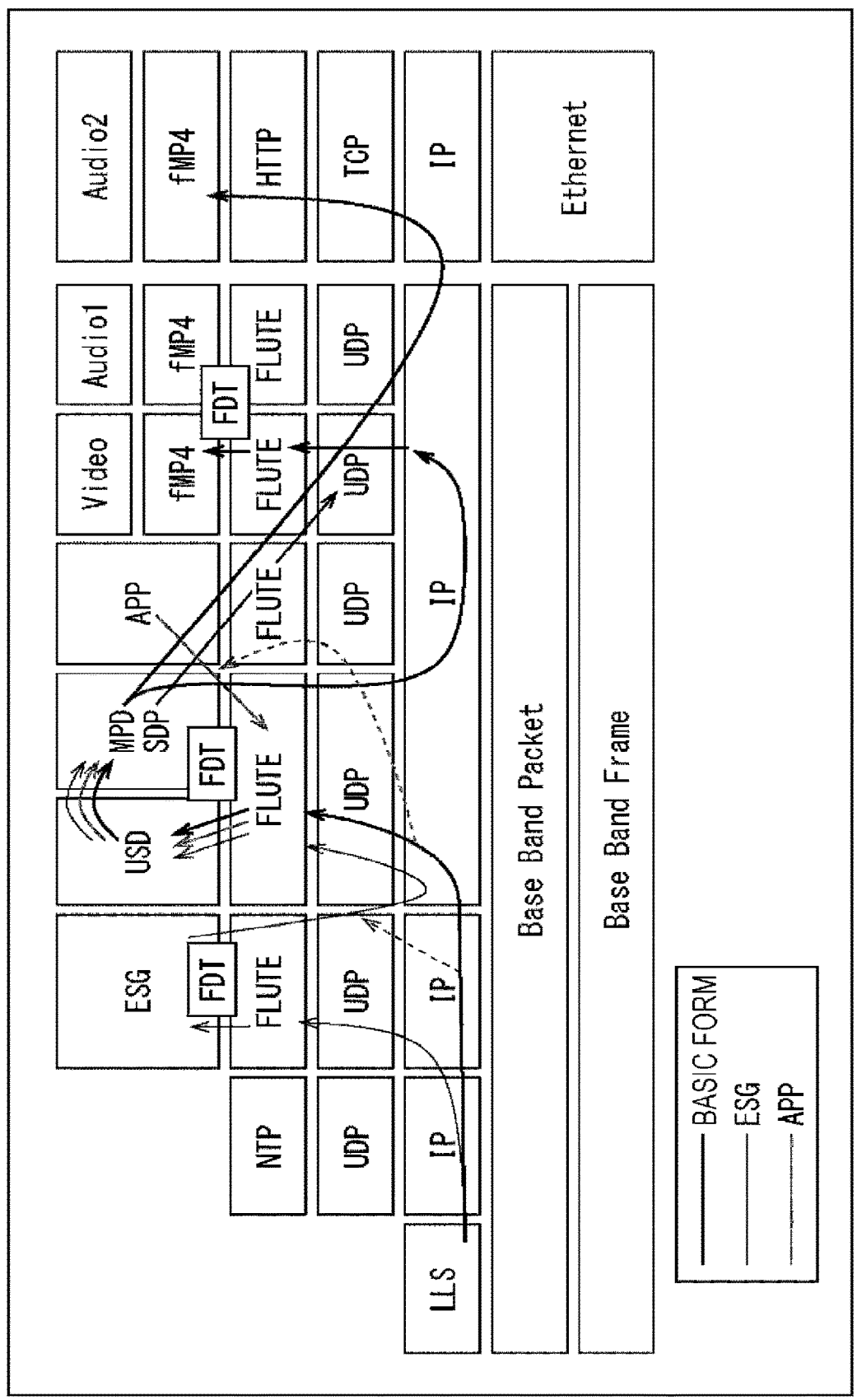
FIG. 21 is a diagram illustrating a protocol stack according to Operation Example 4.

FIG. 21 is a diagram illustrating a protocol stack of the digital broadcasting of the IP transfer system according to Operation Example 4.

Unlike Operation Example 1, since Operation Example 4 is configured to transfer the video data and the audio data 1 using the FLUTE session and to deliver the audio data 2 from the delivery server 30 through the internet 90. Accordingly, in addition to the protocol stack of the digital broadcasting of the IP transfer system, a protocol stack of the communication is illustrated. The audio data 2 (Audio2) is transferred by a protocol of TCP/IP.

In a basic form, first, the LLS transferred onto the BBP stream is acquired and the USD is acquired based on the index information of the FDT transferred periodically in the specific FLUTE session (TSI: Z) using SCS_bootstrap information included in the SCT. In addition, MPD and SDP transferred by the specific FLUTE session (TSI: Z) are acquired in accordance with the acquired USD. Then, according to Operation Example 4, the audio data 1 is transferred by the specific FLUTE session (TSI: Y); however, since it is set such that the second language is prioritized, the audio data 2 is acquired by accessing the delivery server 30 in accordance with the MPD.

(Relevance of Information Included in Control Signal of Operation Example 4)

Figure 22:
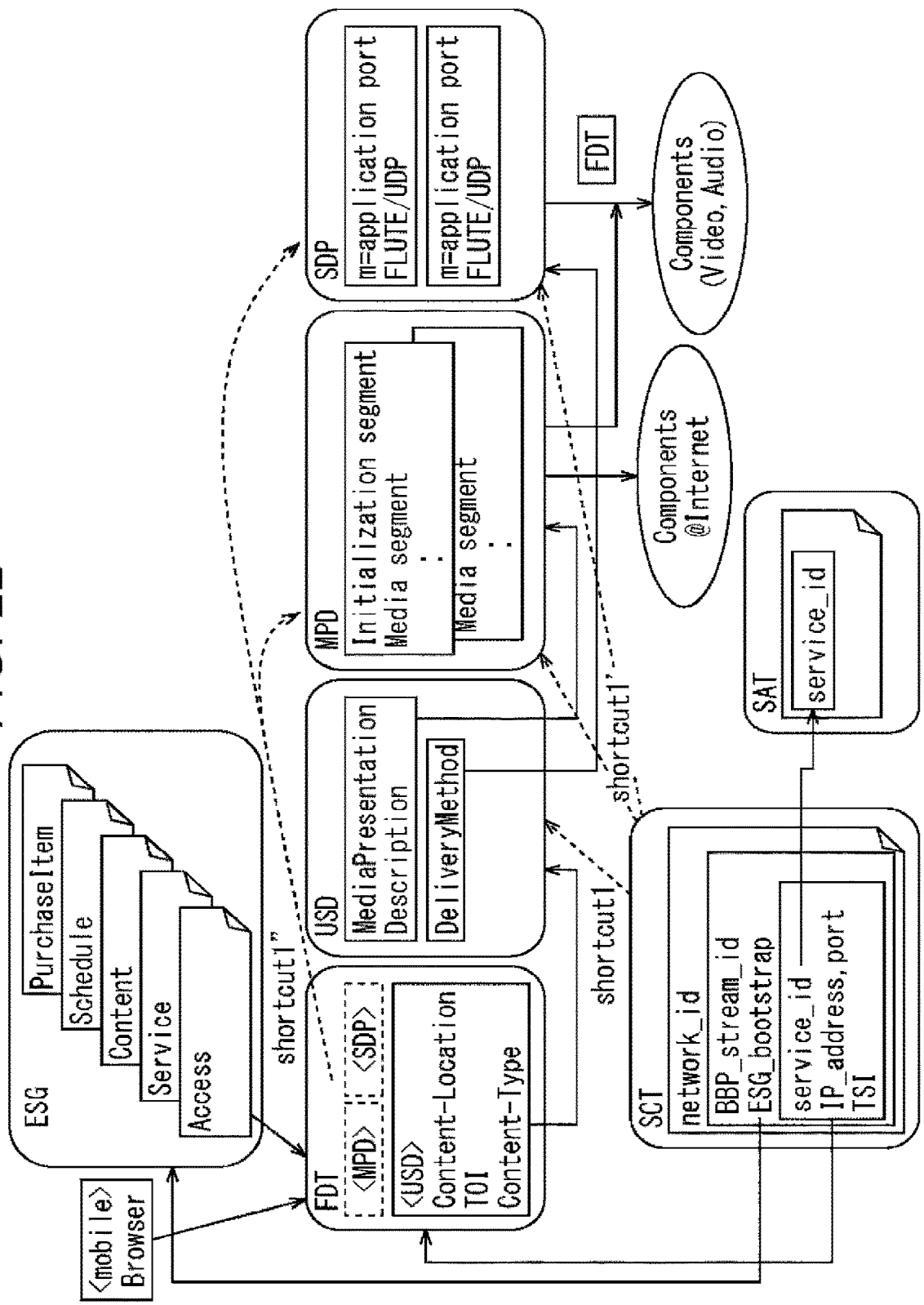
FIG. 22 is a diagram illustrating relevance of information included in a control signal according to Operation Example 4.

FIG. 22 is a diagram illustrating relevance of information included in a control signal according to Operation Example 4.

Unlike Operation Example 1, since Operation Example 4 is configured to deliver the component such as the audio data 2 from the delivery server 30 through the internet 90, the component is acquired from the delivery server 30 on the internet 90 in accordance with the segment URL of the MPD. In addition, when the component is transferred by the broadcasting, the component transferred by the specific FLUTE session is acquired in accordance with the SDP.

In addition, as in Operation Example 1, since Operation Example 4 is configured such that the TOI of the USD, MPD, and SDP is set as a fixed value and then the value of the TOI may be described in the SCT, as illustrated in FIG. 22, it is possible to access the USD from the SCT without passing the FDT ("shortcut1" in the drawing). In addition, it is possible to access the MPD and SDP from the SCT without passing the FDT and USD ("shortcut1'" in the drawing). Moreover, it is possible to access the MPD and SDP without passing the USD by allowing the FDT to include information ("<MPD>" and "<SDP>" surrounded by dotted lines in the drawing) indicating an acquisition destination of the MPD and SDP ("shortcut1'"" in the drawing).

Further, in the relevance of the information of FIG. 22 according to Operation Example 4, since the relevance of the information other than the above description is similar to the relevance of the information of FIG. 13 according to Operation Example 1, the description thereof will be not presented.

<5. Contents of Concrete Processing to be Executed by Each Device>

The following discloses contents of concrete processing to be executed by each device constituting the broadcasting system 1 of FIG. 8 with reference to flowcharts of FIGS. 23 to 26.

(Transmission Processing)

Figure 23:
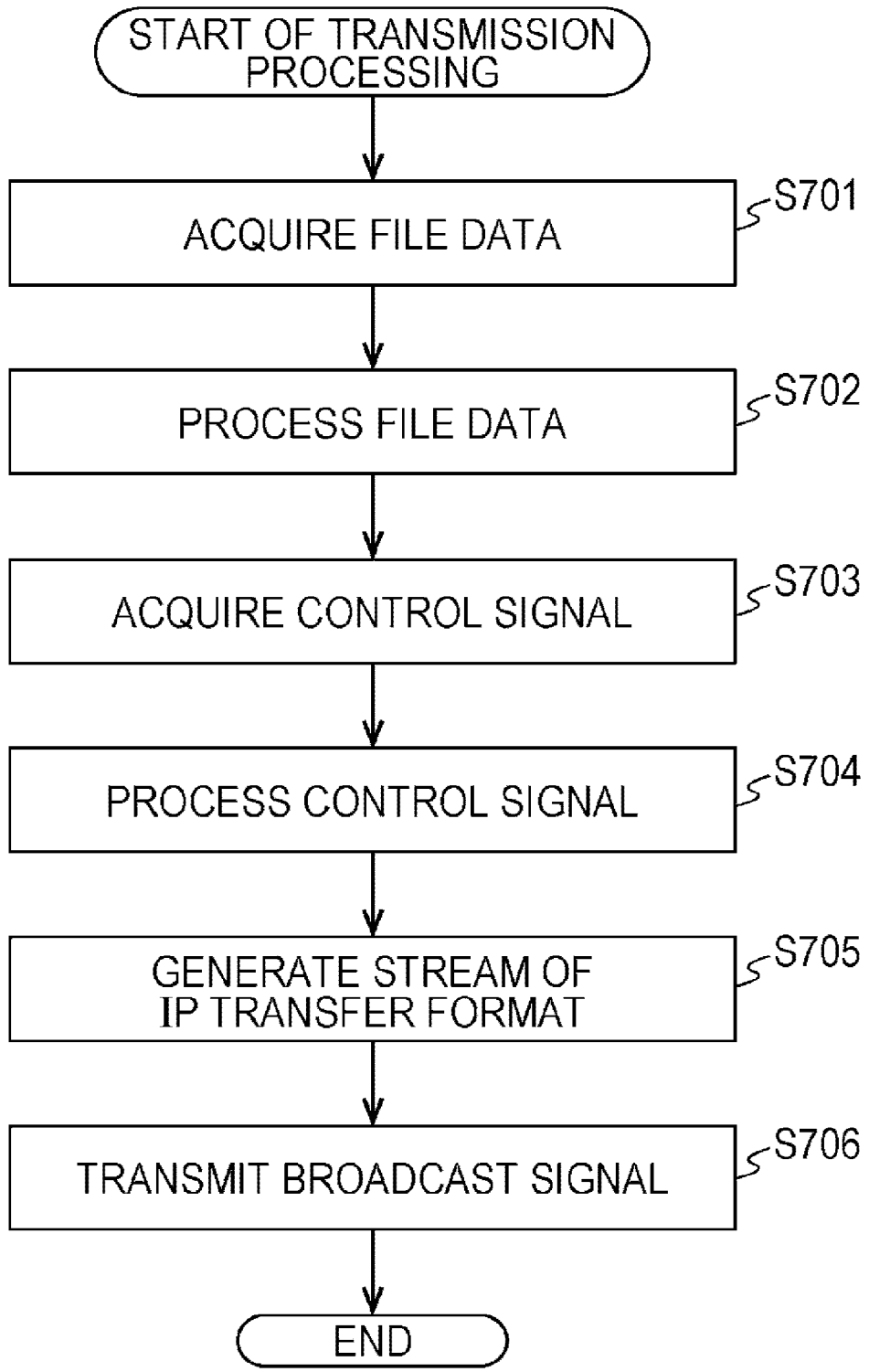
FIG. 23 is a flowchart illustrating transmission processing.

First, transmission processing executed by the transmission device 10 of FIG. 8 will be disclosed with reference to the flowchart of FIG. 23.

In step S701, the file data acquisition unit 115 acquires, for example, file data such as the video data or the audio data and supplies the acquired file data to the file processing unit 116.

In step S702, the file processing unit 116 performs file processing on the file data supplied from the file data acquisition unit 115 to transfer the file-processed file data using the FLUTE session and supplies the file-processed file data to the Mux 119.

In step S703, the control signal acquisition unit 117 acquires the control signal such as the SCS or the LLS and supplies the acquired control signal to the control signal processing unit 118.

In step S704, the control signal processing unit 118 performs predetermined signal processing on the control signal supplied from the control signal acquisition unit 117 and supplies the signal-processed control signal to the Mux 119. For example, the control signal processing unit 118 performs the signal processing for the purpose of transferring using the FLUTE session on the SCS acquired by the control signal acquisition unit 117.

In step S705, the Mux 119 multiplexes the file data supplied from the file processing unit 116 and the control signal supplied from the control signal processing unit 118 to generate the BBP stream of the IP transfer format and supplies the generated BBP stream to the transmission unit 120.

In step S706, the transmission unit 120 transmits the BBP stream supplied from the Mux 119 as a broadcast signal through the antenna 121. When the processing of step S706 is completed, the transmission processing is completed.

The transmission processing was disclosed above.

(Channel Selection Processing)

Figure 24:
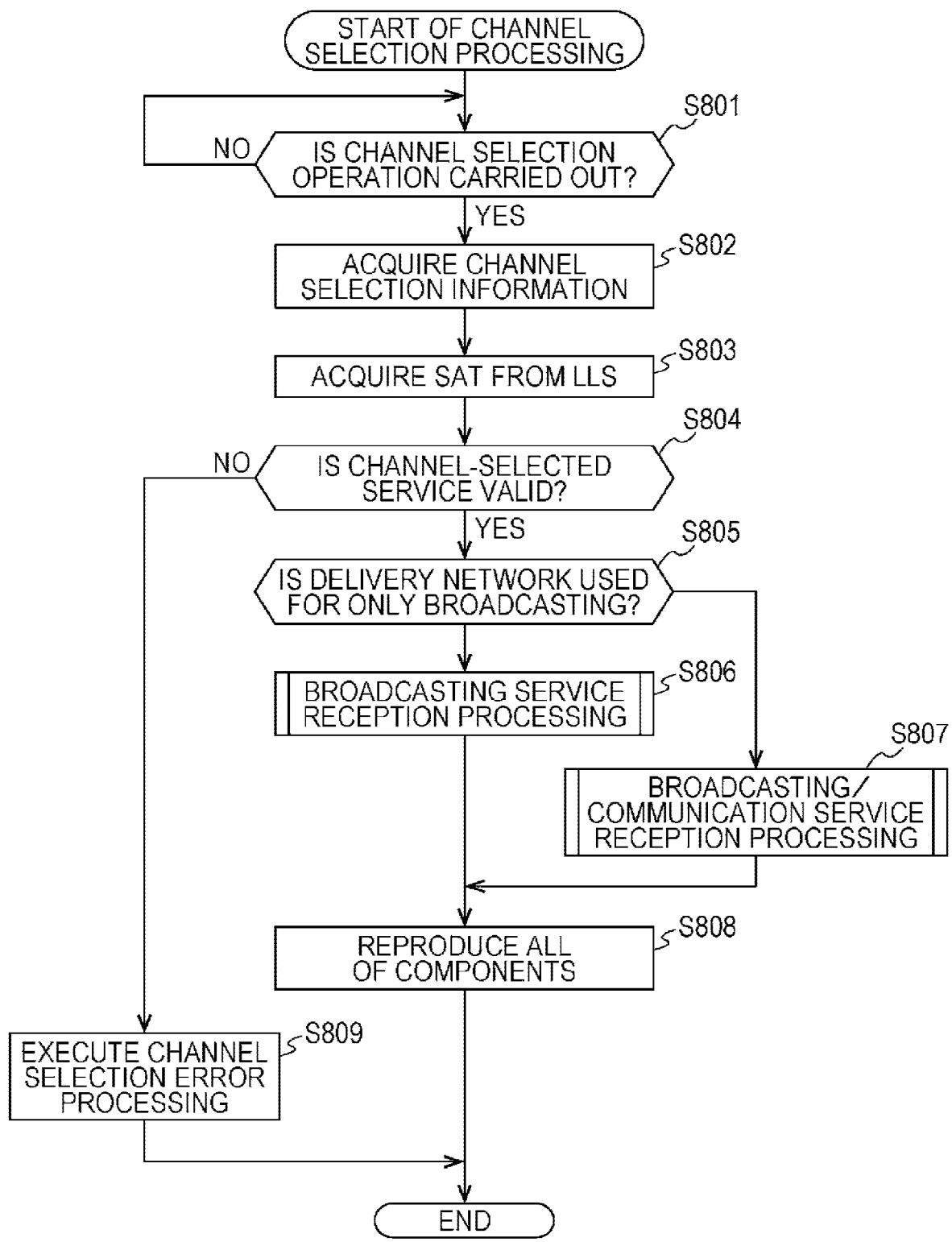
FIG. 24 is a flowchart illustrating channel selection processing.

The following discloses channel selection processing executed by the reception device 20 of FIG. 8 with reference to the flowchart of FIG. 24.

In step S801, it is determined whether a channel selection operation is carried out by, for example, an operation of a remote controller by the viewer. In step S801, after the channel selection operation by the viewer, the process proceeds to step S802.

In step S802, the control signal processing unit 221 acquires the channel selection information (SCT) recorded in the NVRAM 222. Further, the channel selection information may be acquired from the server on the internet 90.

In step S803, the control signal processing unit 221 acquires the SAT from the LLS. Then, in step S804, the control signal processing unit 221 determines whether the channel-selected specific service is valid (on-air) based on the SAT. In step S804, when it is determined that the channel-selected specific service is valid, the process proceeds to step S805.

In step S805, the control signal processing unit 221 determines whether a delivery network is used for only the broadcasting with reference to the service type of the SAT. In step S805, when it is determined that the delivery network is used for only the broadcasting, that is, the "broadcasting" is designated as the service type of the SAT, the process proceeds to step S806.

In step S806, the broadcasting service reception processing is executed. In the broadcasting service reception processing, the processing of receiving the stream of each component is executed in accordance with the SDP acquired from the SCS. Details of the broadcasting service reception processing will be disclosed below with reference to the flowchart of FIG. 25.

On the other hand, in step S805, when it is determined that the delivery network is not used for only the broadcasting, that is, the delivery network is used for the broadcasting and the communication and the "hybrid" is designated as the service_type of the SAT, the process proceeds to step S807.

In step S807, broadcasting/communication service reception processing is executed. In the broadcasting/communication service reception processing, the processing of receiving the stream of each component is executed in accordance with the SDP and MPD acquired from the SCS. Details of the broadcasting/communication service reception processing will be disclosed below with reference to the flowchart of FIG. 26.

When the service reception processing of step S806 or S807 is completed, the process proceeds to step S808. In step S808, all of the components acquired by the broadcasting service reception processing (S806) or the broadcasting/communication service reception processing (S807) are reproduced. Thus, for example, the video corresponding to the video data transferred by the broadcasting or communication is displayed on the display and the audio corresponding to the audio data transferred by the broadcasting or communication synchronized with the video is output from the loudspeaker.

When the process of step S808 is completed, the channel selection processing is completed. Further, in step S804, when it is determined that the channel-selected specific service is invalid (not on-air), the process proceeds to step S809. In step S809, a channel selection error processing is executed.

The channel selection processing was disclosed above.

(Broadcasting Service Reception Processing)

Figure 25:
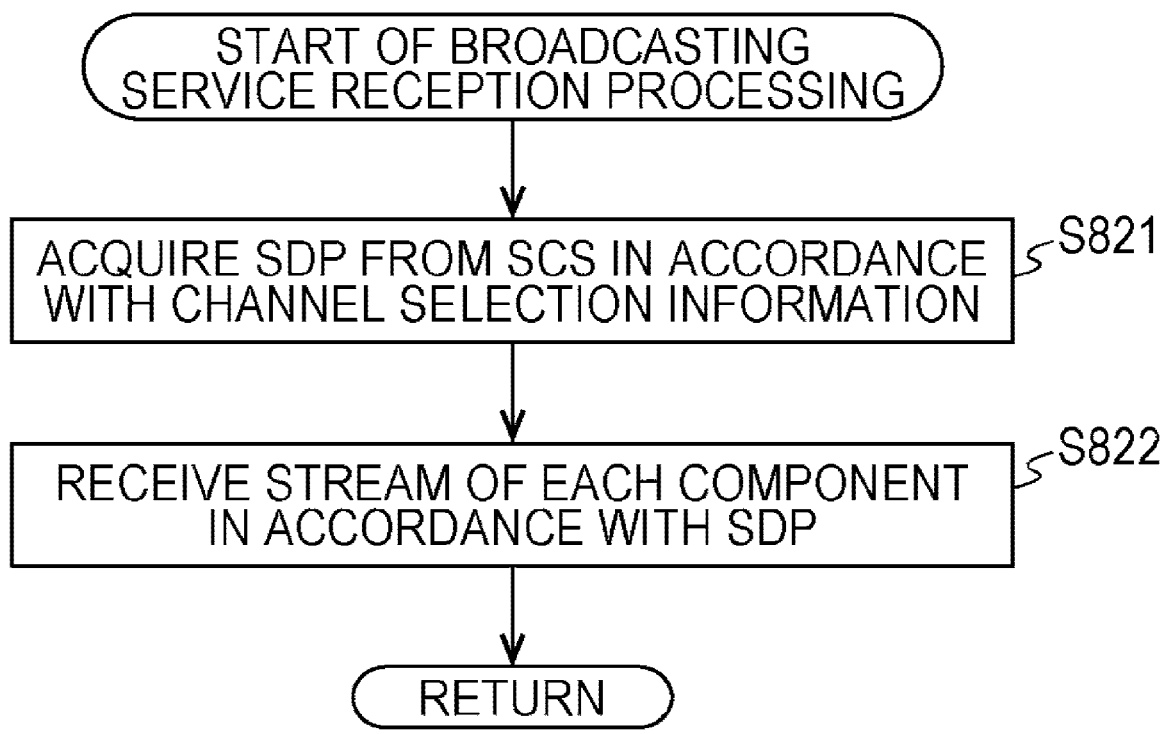
FIG. 25 is a flowchart illustrating broadcasting service reception processing.

The following discloses the broadcasting service reception processing corresponding to step S806 of FIG. 24 with reference to the flowchart of FIG. 25.

In step S821, the FLUTE processing unit 219 acquires the SDP from the SCS transferred by the FLUTE session in accordance with the channel selection information (SCT).

In step S822, the FLUTE processing unit 219 receives the stream of each component transferred by the FLUTE session, in accordance with the information described in the SDP. Consequently, the video data and the audio data transferred by the FLUTE session are acquired as the component.

When the process of step S822 is completed, the process returns to step S806 of FIG. 24, and subsequent processes are executed.

The broadcasting service reception processing was disclosed above.

(Broadcasting/Communication Service Reception Processing)

Figure 26:
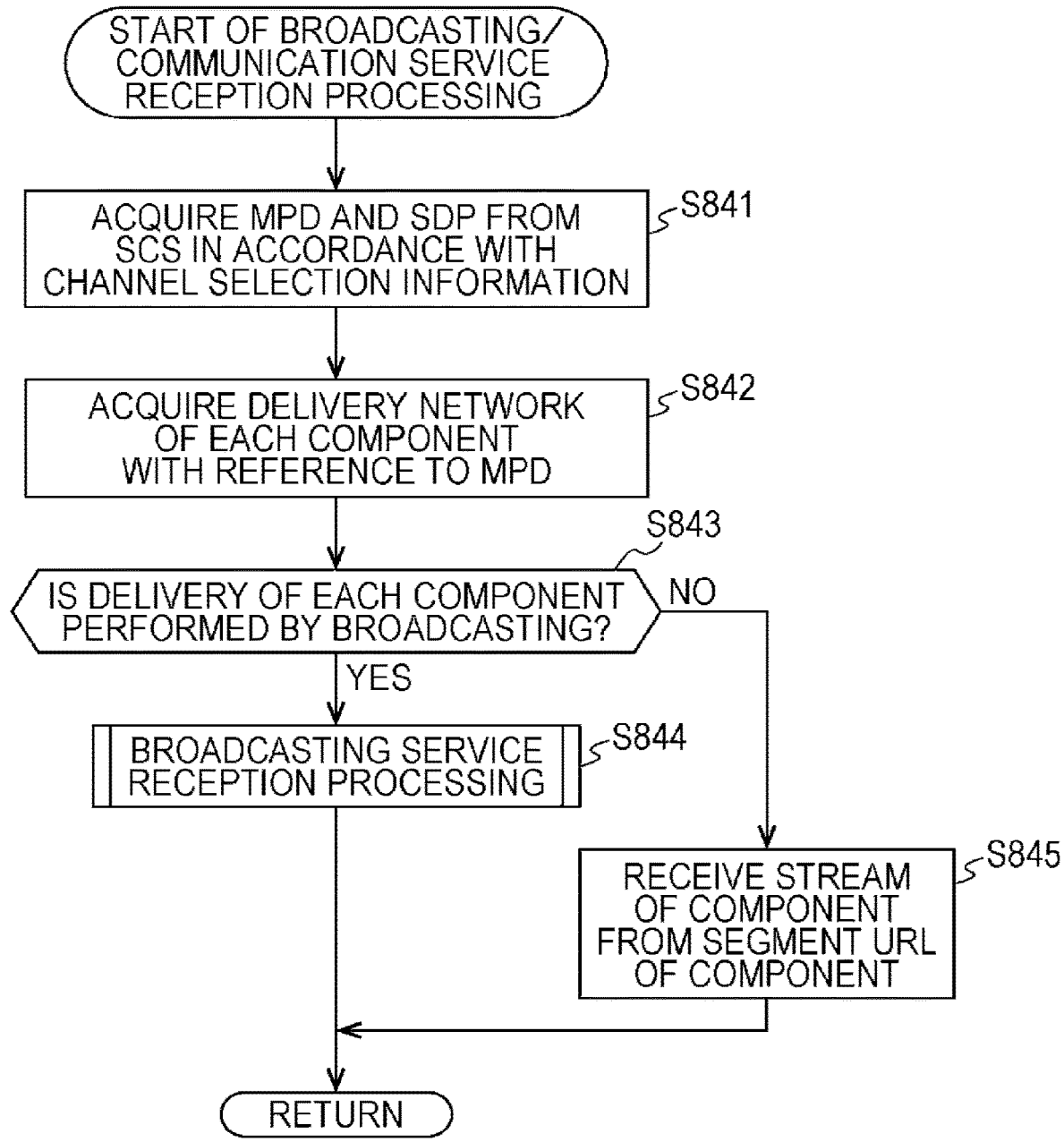
FIG. 26 is a diagram illustrating broadcasting/communication service reception processing.

The following discloses the broadcasting/communication service reception processing corresponding to step S807 of FIG. 24 with reference to the flowchart of FIG. 26.

In step S841, the FLUTE processing unit 219 acquires the MPD and SDP from the SCS transferred by the FLUTE session, in accordance with the channel selection information (SCT).

In step S842, the FLUTE processing unit 219 acquires the delivery network of each component with reference to the MPD. Here, the delivery network of each component is acquired with reference to the component type and the transfer type value for each component.

In step S843, it is determined whether the delivery of each component is performed by the broadcasting, in accordance with the delivery network of each component acquired by the process of step S842. In step S843, when it is determined that the "broadcasting" is designated as the transfer type value and that the delivery of the component is performed by the broadcasting, the process proceeds to step S844.

In step S844, the broadcasting service reception processing of FIG. 25 is executed. In the broadcasting service reception processing, the processing of receiving the stream of each component is executed in accordance with the SDP acquired from the SCS. For example, the video data and the audio data transferred by the FLUTE session are acquired as the component.

In step S843, further, when it is determined that the "hybrid" is designated as the transfer type value and the delivery of the component is not performed by the broadcasting, that is, the delivery of the component is performed by the communication, the process proceeds to step S845.

In step S845, the communication I/F 223 accesses the delivery server 30 designated by the segment URL of the component through the Internet 90, in accordance with the control from the FLUTE processing unit 219, and receives the stream of the component. The stream of the component is supplied to the stream processing unit 225.

Then, it is determined for each component whether the delivery of the component is performed by the broadcasting. The process of step S844 is executed when the component is delivered by the broadcasting, the process of step S845 is executed when the component is delivered by the communication, and therefore, it is possible to acquire all of the components transferred by the broadcasting or communication.

When the process of step S844 or step S845 is completed, the process returns to step S807 of FIG. 24, and subsequent processes are executed.

The broadcasting/communication service reception processing was disclosed above.

<Explanation of Computer to Which Present Technology is Applied>

The above-described sequence of processing operations may be executed by software as well as hardware. When the sequence of processing operations is to be executed by the software, the programs constituting the software are installed in a computer. Here, the computer may be, for example, a computer built in dedicated hardware or, for example, a general-purpose personal computer in which various programs may be installed for the execution of various functions.

FIG. 27 is a block diagram illustrating a configuration example of the hardware of the computer which executes the above-described sequence of processing operations by programs.

In a computer 900, a central processing unit (CPU) 901, a read only memory (ROM) 902, and a random access memory (RAM) 903 are interconnected by a bus 904. The bus 904 is further connected with an input/output interface 905. The input/output interface 905 is connected with an input unit 906, an output unit 907, a recording unit 908, a communication unit 909, and a drive 910.

The input unit 906 may include, for example, a keyboard, a mouse, and a microphone. The output unit 907 may include a display and a loudspeaker, for example. The recording unit 908 may include a hard disk and a nonvolatile memory, for example. The communication unit 909 may include a network interface, for example. The drive 910 drives a removable media 911 such as a magnetic disk, an optical disk, a magneto-optical disk, or a semiconductor memory.

In the computer 900 configured as disclosed above, the CPU 901 performs the above-described sequence of processing operations by loading programs which are recorded in the recording unit 908 into the RAM 903 via the input/output interface 905 and the bus 904 and executing the loaded programs.

Programs to be executed by the computer 900 (or the CPU 901) can be, for example, provided by recording them in the removable media 911 that is a package media. The programs may also be provided via wired or wireless transfer medium such as a local area network, the Internet, and digital satellite broadcasting.

In the computer 900, programs can be installed in the recording unit 908 via the input/output interface 905 by loading the removable media 911 on the drive 910. The programs can also be installed in the recording unit 908 by receiving them through the communication unit 909 via the wired or wireless transfer medium. In addition, the programs can be installed in the ROM 902 or the recording unit 908 in advance.

Further, the programs to be executed by the computer 900 may be processed sequentially in a time-dependent manner disclosed herein, or in a parallel manner, or at required timings such as when they are called.

Here, in this specification, the process steps, in which programs that cause the computer 900 to execute various kinds of processing are written, is not necessary to be sequentially processed in the time-dependent manner disclosed in the flowcharts; these programs may be processed in a parallel manner or individually (e.g., parallel processing or processing by object).

In addition, the programs may be processed by one computer or processed by a plurality of computers in a distributed manner. The programs may also be transferred to a remote computer to be executed.

In addition, in this specification, a system means a collection of a plurality of component elements (devices, modules (components), and the like), and all component elements need not be arranged in the same housing. Therefore, a plurality of devices accommodated in different housings and interconnected through a network is a system; and one device in which a plurality of modules is accommodated in a single housing is a system as well.

Embodiments of the present technology are not limited to those disclosed herein, and various changes may be made without departing from the spirit and scope of the present technology. For example, the present technology can be configured as a cloud computing system in which one function is processed jointly and cooperatively by a plurality of devices via the network.

The steps disclosed using the above flowcharts may be executed by one device or a plurality of devices in a distributed manner. Further, if one step includes a plurality of processes, the plurality of processes included in the one step may be executed not only by one device, but also by the plurality of devices in a distributed manner.

The present technology may also take the following configuration.

(1)

A reception device including circuitry configured to receive a digital broadcast signal including an internet protocol (IP) transport stream; and acquire one or more components of a specific service of a plurality of services included in the digital broadcast signal in accordance with first control information, the first control information including component type information and transfer type information of the one or more components of the specific service.

(2)

The reception device according to (1) above, wherein the transfer type information of the one or more components indicates whether each of the one or more components is broadcasted or provided via another communication medium.

(3)

The reception device according to (1) or (2) above, wherein the first control information is transferred by a first layer which is higher than an IP layer of a protocol used to transmit the digital broadcast signal.

(4)

The reception device according to (3) above, wherein the circuitry is configured to acquire second control information that is transferred by a packet having a structure which is different from a structure of an IP packet and acquire the one or more components of the specific service in accordance with the second control information, the second control information including information indicating a transfer type of the specific service.

(5)

The reception device according to (4) above, wherein the second control information includes information indicating whether the specific service of the plurality of services is on-air.

(6)

The reception device according to (4) or (5), wherein the second control information includes information indicating whether third control information is to be acquired, the third control information including information for acquiring the first control information.

(7)

The reception device according to (6) above, wherein the one or more components, the first control information, and the third control information are transferred by a file delivery over unidirectional transport (FLUTE) session.

(8)

A reception method of a reception device, the method including:

receiving, by circuitry of the reception device, a digital broadcast signal including an IP transport stream; and acquiring, by the circuitry, one or more components of a specific service of a plurality of services included in the digital broadcast signal in accordance with control information, the control information including component type information and transfer type information of the one or more components of the specific service.

(9)

A transmission device including circuitry configured to acquire one or more components of a specific service;

acquire control information including component type information and transfer type information of the one or more components of the specific service; and transmit a digital broadcast signal including the one or more components of the specific service and the control information, the digital broadcast signal including an IP transport stream.

(10)

A transmission method of a transmission device, the method including:

acquiring one or more components of a specific service;

acquiring, by circuitry of the transmission device, control information including component type information and transfer type information of the one or more components of the specific service; and transmitting, by the circuitry, a digital broadcast signal including the one or more components of the specific service and the control information, the digital broadcast signal including an IP transport stream.

(11)

A reception device including circuitry configured to receive a digital broadcast signal including an IP transport stream; and acquire one or more components of a specific service of a plurality of services included in the digital broadcast signal in accordance with second control information, the second control information including information indicating a transfer type of the specific service.

(12)

The reception device according to (11) above, wherein the second control information includes information indicating whether the specific service of the plurality of services is on-air.

(13)

The reception device according to (11) or (12) above, wherein the second control information is transferred by a packet having a structure which is different from a structure of an IP packet.

(14)

The reception device according to (13) above, wherein the circuitry is configured to acquire the one or more components of the specific service in accordance with first control information, the first control information including component type information and transfer type information of the one or more components of the specific service.

(15)

The reception device according to (14) above, wherein the transfer type information of the one or more components indicates whether each of the one or more components is broadcasted or provided via another communication medium.

(16)

The reception device according to (14) or (15) above, wherein the second control information includes information indicating whether third control information is to be acquired, the third control information including information for acquiring the first control information.

(17)

The reception device according to (16) above, wherein the one or more components, the first control information, and the third control information are transferred by a FLUTE session.

(18)

A reception method of a reception device, the method including:

receiving, by circuitry of the reception device, a digital broadcast signal including an IP transport stream; and acquiring, by the circuitry, one or more components of a specific service of a plurality of services included in the digital broadcast signal in accordance with control information, the control information including information indicating a transfer type of the specific service.

(19)

A transmission device including circuitry configured to acquire one or more components of a specific service; acquire control information including information indicating a transfer type of the specific service; and transmit a digital broadcast signal including the one or more components of the specific service and the control information, the digital broadcast signal including an IP transport stream.

(20)

A transmission method of a transmission device, the method including:

acquiring one or more components of a specific service;

acquiring, by circuitry of the transmission device, control information including information indicating a transfer type of the specific service; and transmitting a digital broadcast signal including the one or more components of the specific service and the control information, the digital broadcast signal including an IP transport stream.

REFERENCE SIGNS LIST

1 Broadcasting system
10 Transmission device
20 Reception device
30 Delivery server
115 File data acquisition unit
117 Control signal acquisition unit
119 Mux
120 Transmission unit
212 Tuner
213 Demux
219 FLUTE processing unit
221 Control signal processing unit
222 NVRAM
223 Communication I/F 225 Stream processing unit
900 Computer
901 CPU

The invention claimed is:

1. A reception device comprising:
circuitry configured to
receive a digital broadcast signal including an internet protocol (IP) transport stream;
acquire one or more components of a specific service of a plurality of services included in the digital broadcast signal in accordance with first control information, the first control information including transfer type information of the one or more components of the specific service, wherein the first control information is transferred by a first layer which is higher than an IP layer of a protocol stack used to transmit the digital broadcast signal; and
acquire second control information that is transferred by a packet having a structure which is different from a structure of an IP packet, and acquire the one or more components of the specific service in accordance with the second control information, wherein the second control information is transferred by a second layer which is higher than a lowest layer and lower than the first layer within the protocol stack.

2. The reception device according to claim 1, wherein the transfer type information of the one or more components indicates whether each of the one or more components is broadcasted or provided via another communication medium.

3. The reception device according to claim 1, wherein the second control information includes information indicating whether the specific service of the plurality of services is on-air.

4. The reception device according to claim 3, wherein the second control information includes information indicating whether third control information is to be acquired, the third control information including information for acquiring the first control information.

5. The reception device according to claim 4, wherein the one or more components, the first control information, and the third control information are transferred by a file delivery over unidirectional transport (FLUTE) session.

6. A reception method of a reception device, the method comprising:
receiving, by circuitry of the reception device, a digital broadcast signal including an internet protocol (IP) transport stream;
acquiring, by the circuitry, one or more components of a specific service of a plurality of services included in the digital broadcast signal in accordance with control information, the control information including transfer type information of the one or more components of the specific service, wherein the first control information is transferred by a first layer which is higher than an IP layer of a protocol stack used to transmit the digital broadcast signal; and
acquiring, by the circuitry, second control information that is transferred by a packet having a structure which is different from a structure of an IP packet, and acquire the one or more components of the specific service in accordance with the second control information, wherein the second control information is transferred by a second layer which is higher than a lowest layer and lower than the first layer within the protocol stack.

7. The reception method according to claim 6, wherein the transfer type information of the one or more components indicates whether each of the one or more components is broadcasted or provided via another communication medium.

8. The reception method according to claim 6, wherein the second control information includes information indicating whether the specific service of the plurality of services is on-air.

9. The reception method according to claim 8, wherein the second control information includes information indicating whether third control information is to be acquired, the third control information including information for acquiring the first control information.

10. The reception method according to claim 9, wherein the one or more components, the first control information, and the third control information are transferred by a file delivery over unidirectional transport (FLUTE) session.

11. A transmission device comprising:
circuitry configured to
acquire one or more components of a specific service;
acquire first control information including transfer type information of the one or more components of the specific service, wherein the first control information is transferred by a first layer which is higher than an IP layer of a protocol stack used to transmit the digital broadcast signal;
acquire second control information; and
transmit a digital broadcast signal including the one or more components of the specific service and the control information, the digital broadcast signal including an internet protocol (IP) transport stream,
wherein the first control information is transferred by a first layer which is higher than an IP layer of a protocol used to transmit the digital broadcast signal, second control information is transferred by a packet having a structure which is different from a structure of an IP packet, and the second control information is transferred by a second layer which is higher than a lowest layer and lower than the first layer within the protocol stack.

12. A transmission method of a transmission device, the method comprising:
acquiring one or more components of a specific service;
acquiring, by circuitry of the transmission device, first control information including transfer type information of the one or more components of the specific service, wherein the first control information is transferred by a first layer which is higher than an IP layer of a protocol stack used to transmit the digital broadcast signal;
acquiring, by the circuitry, second control information; and
transmitting, by the circuitry, a digital broadcast signal including the one or more components of the specific service and the control information, the digital broadcast signal including an internet protocol (IP) transport stream,
wherein the first control information is transferred by a first layer which is higher than an IP layer of a protocol used to transmit the digital broadcast signal, second control information is transferred by a packet having a structure which is different from a structure of an IP packet, and the second control information is transferred by a second layer which is higher than a lowest layer and lower than the first layer within the protocol stack.

13. A non-transitory computer readable medium that stores a program which when executed by a reception device, causes the reception device to perform a method comprising:
- receiving, by circuitry of the reception device, a digital broadcast signal including an internet protocol (IP) transport stream;
- acquiring, by the circuitry, one or more components of a specific service of a plurality of services included in the digital broadcast signal in accordance with control information, the control information including transfer type information of the one or more components of the specific service, wherein the first control information is transferred by a first layer which is higher than an IP layer of a protocol stack used to transmit the digital broadcast signal; and
- acquiring, by the circuitry, second control information that is transferred by a packet having a structure which is different from a structure of an IP packet, and acquire the one or more components of the specific service in accordance with the second control information, wherein the second control information is transferred by a second layer which is higher than a lowest layer and lower than the first layer within the protocol stack.

* * * * *